US009137655B2

(12) United States Patent
Richardson et al.

(10) Patent No.: US 9,137,655 B2
(45) Date of Patent: Sep. 15, 2015

(54) METHODS AND APPARATUS FOR SUPPORTING PEER TO PEER COMMUNICATIONS

(71) Applicant: QUALCOMM Incorporated, San Diego, CA (US)

(72) Inventors: Thomas J. Richardson, South Orange, NJ (US); Vincent Loncke, Piscataway, NJ (US); Edward Knapp, Basking Ridge, NJ (US); Sathyadev Uppala, Whitehouse Station, NJ (US); Krishna G. Murti, Colts Neck, NJ (US); Victor A. Abramsky, Southhampton, PA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 13/645,366

(22) Filed: Oct. 4, 2012

(65) Prior Publication Data

US 2013/0089010 A1    Apr. 11, 2013

Related U.S. Application Data

(60) Provisional application No. 61/545,019, filed on Oct. 7, 2011.

(51) Int. Cl.
*H04W 8/22* (2009.01)
*H04W 76/02* (2009.01)
(Continued)

(52) U.S. Cl.
CPC .............. *H04W 8/22* (2013.01); *H04W 76/023* (2013.01); *H04W 72/1215* (2013.01); *H04W 88/06* (2013.01)

(58) Field of Classification Search
CPC ................................ H04W 8/22; H04W 88/06
USPC ................................ 370/280; 455/420, 552.1
See application file for complete search history.

(56) References Cited

U.S. PATENT DOCUMENTS 7,239,874 B2    7/2007   Reddy et al.
8,369,800 B2    2/2013   Li et al.
(Continued)

FOREIGN PATENT DOCUMENTS

WO    2008034029         3/2008
WO    2008034038  A1     3/2008
(Continued)

OTHER PUBLICATIONS

International Search Report and Written Opinion—PCT/US2012/059232—ISA/EPO—Mar. 27, 2013.

*Primary Examiner* — Albert T Chou
(74) *Attorney, Agent, or Firm* — James K. O'Hare

(57) ABSTRACT

Methods and apparatus for supporting peer to peer and infrastructure, e.g., cellular, communication in a multimode device which can operate in a cellular system are described. Methods and apparatus for supporting peer to peer devices are also described. Peer to peer communication occurs within a switching time period during which infrastructure signaling does not occur and devices switch between an uplink and a downlink mode of infrastructure operation. The time period set for the switching time period is intentionally set larger, e.g., 10, 50, 100 or even more times larger than that required based on maximum cell size. Thus, a peer to peer communications period can be introduced into a TDD system and use the same frequency band as the TDD system in a manner that can remain compliant with a cellular communications protocol which allows for a switching time period, e.g., set in the system by a parameter.

25 Claims, 14 Drawing Sheets

(51) Int. Cl.
*H04W 88/06* (2009.01)
*H04W 72/12* (2009.01)

(56) References Cited

U.S. PATENT DOCUMENTS

| | | |
|---|---|---|
| 2007/0274275 A1 | 11/2007 | Laroia et al. |
| 2007/0291714 A1 | 12/2007 | Laroia et al. |
| 2008/0069033 A1 | 3/2008 | Li et al. |
| 2008/0069062 A1* | 3/2008 | Li et al. ........................ 370/338 |
| 2008/0069063 A1 | 3/2008 | Li et al. |
| 2010/0128701 A1 | 5/2010 | Nagaraja |
| 2010/0136997 A1 | 6/2010 | Palanki et al. |
| 2011/0143696 A1 | 6/2011 | Luo et al. |
| 2011/0216842 A1 | 9/2011 | Zhang et al. |
| 2011/0255450 A1 | 10/2011 | Wang et al. |
| 2012/0044841 A1 | 2/2012 | Chen et al. |
| 2012/0117155 A1 | 5/2012 | Li et al. |
| 2012/0294209 A1* | 11/2012 | Periyalwar et al. ........... 370/280 |
| 2013/0039262 A1* | 2/2013 | Lim et al. ...................... 370/315 |
| 2014/0029568 A1* | 1/2014 | Wang et al. ................... 370/330 |
| 2014/0119261 A1 | 5/2014 | Wang et al. |
| 2014/0126432 A1 | 5/2014 | Wang et al. |

FOREIGN PATENT DOCUMENTS

| | | |
|---|---|---|
| WO | 2011130626 A1 | 10/2011 |
| WO | WO-2011130630 A1 | 10/2011 |
| WO | WO-2012048464 A1 | 4/2012 |
| WO | 2012068731 A1 | 5/2012 |
| WO | WO-2013108219 A1 | 7/2013 |

* cited by examiner

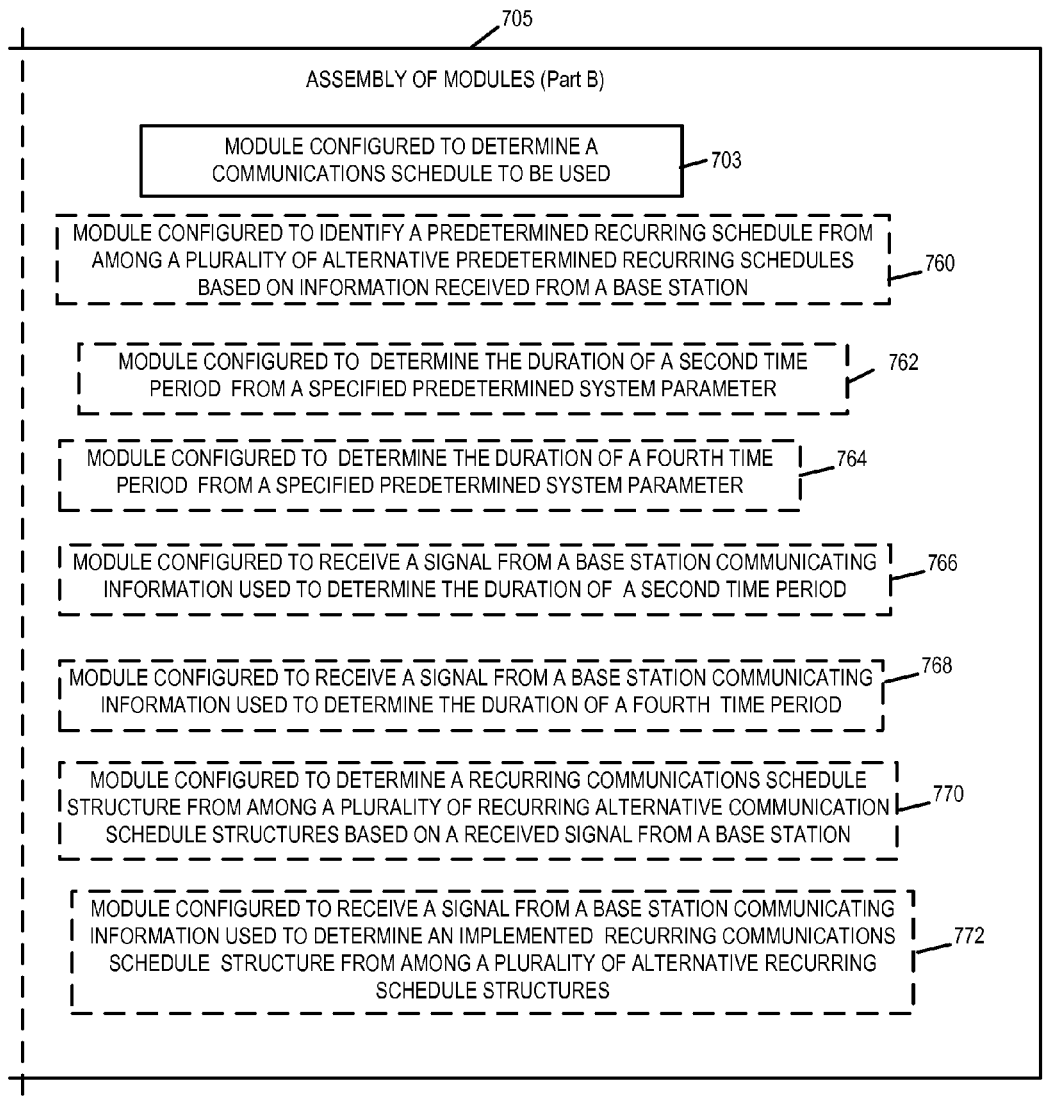
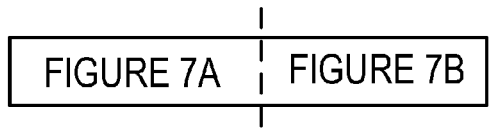
FIGURE 7

METHODS AND APPARATUS FOR SUPPORTING PEER TO PEER COMMUNICATIONS

RELATED APPLICATIONS

The present application claims the benefit of the filing date of Provisional Patent Application Ser. No. 61/545,019, filed Oct. 7, 2011, titled "METHODS AND APPARATUS FOR SUPPORTING MULTIPLE COMMUNICATIONS MODES" which is hereby expressly incorporated by reference in its entirety.

FIELD

Various embodiments relate to wireless communications methods and apparatus and, more particularly, to methods of apparatus for supporting peer to peer communications, e.g., using infrastructure spectrum.

BACKGROUND

Communications systems and devices are becoming increasingly diverse with new technological advancements. Communications devices are now able to support various different communications technologies and protocols. Various communications devices can operate in a communications system, e.g., network, and may communicate with each other, e.g., using direct peer to peer communications, also sometimes referred to as device to device communications, or using an infrastructure element, e.g., with communication between the devices being achieved with signals being communicated via a base station.

Some systems allow devices to operate in multiple modes of communications but do not allow use of the same common frequency spectrum used for infrastructure communications for peer to peer communications. That is, a different frequency spectrum, other than the frequency spectrum used for infrastructure based communications, is needed in some systems for devices to communicate peer to peer signaling, e.g., peer discovery signals.

It would be useful if methods and apparatus could be developed which would allow a device to use a frequency band which is used for infrastructure communication for at least some peer to peer communication. While not necessary for all embodiments, it is desirable that at least some embodiments allow a frequency band which is used to support time division duplexing (TDD) infrastructure communication to also be used, during at least some time intervals, for peer to peer communication.

SUMMARY

Some aspects are directed to methods and apparatus for supporting peer to peer and infrastructure, e.g., cellular, communication in a system are described. Multi-mode devices which support both infrastructure, e.g., cellular, and peer to peer communications are described. In addition peer to peer devices which do not implement or support infrastructure communications but which can be used in a system where infrastructure communications, e.g., cellular communications are implemented are described. The multi-mode and peer to peer communications devices may, and in some embodiments are, user equipment devices.

Peer to peer communication is performed within a switching time period during which infrastructure signals are not transmitted and devices, e.g., user equipment and/or base station devices, switch between an uplink and a downlink mode of infrastructure operation. The time period set for the switching time period is intentionally set larger, e.g., 10, 50, 100 or even more times larger than that required for cellular operation based on the maximum cell size in the system. By using a relatively long switching time period with regard to infrastructure switching time periods, a peer to peer communications period can, and in various embodiments is, introduced into a TDD system. Thus, by reusing all or portions of the TDD switching time periods for peer to peer communication, peer to peer communication can be implemented using the same frequency band as the TDD system in a manner that can remain compliant with one or more cellular communications protocols. The methods and apparatus of the invention are particularly well suited for use with cellular communications protocols which allow for setting of one or more switching time periods by one or more parameters. By using portions of the switching time periods for peer to peer communication, peer to peer communication can be supported using the same frequency band that is used for cellular TDD communication without causing significant interference to TDD signal transmissions since devices operating in infrastructure mode are to refrain from transmitting during the switching intervals.

Various described methods and apparatus are particularly useful in a communications system supporting TDD cellular communications in which the maximum deployed cell size, e.g., radius, is smaller, e.g., by a factor of 10 or more, than the maximum cell size possible in accordance with the communications standard being used for the TDD cellular communications.

An exemplary method of operating a multi-mode wireless communications device, in accordance with some embodiments, includes: during a first time period, operating in a first one of a downlink mode of operation and an uplink mode of operation using a first communications protocol; during a second time period, switching from said first one of said downlink mode of operation and said uplink mode of operation to a second one of said downlink mode of operation and uplink mode of operation, and performing at least one of receiving and transmitting a peer to peer signal using a second communications protocol which is different from said first communications protocol; and operating during a third time period in said second one of said downlink mode of operation and said uplink mode of operation using said first communications protocol, said third time period following said first and second time periods. An exemplary multi-mode wireless communications device, in accordance with some embodiments includes at least one processor configured to: control said multi-mode wireless communications device to operate, during a first time period, in a first one of a downlink mode of operation and an uplink mode of operation using a first communications protocol; switch, during a second time period, from said first one of said downlink mode of operation and said uplink mode of operation to a second one of said downlink mode of operation and uplink mode of operation; perform, during said second time period, at least one of receiving and transmitting a peer to peer signal using a second communications protocol which is different from said first communications protocol; and control said multi-mode communications device to operate, during a third time period, in said second one of said downlink mode of operation and said uplink mode of operation using said first communications protocol, said third time period following said first and second time periods. The exemplary multi-mode wireless communications device further includes a memory coupled to said at least one processor.

Some methods and apparatus for supporting peer to peer communication by a peer to peer device utilizing TDD spectrum are described. An exemplary method of operating a first communications device, in accordance with some embodiments, includes: synchronizing operation with a second communications device which is a time division duplex (TDD) communications device which uses a TDD communications protocol; and limiting transmission of signals by said first communications device using a first communications protocol, which is different from said TDD communications protocol, to time periods during which said second communications device is switching between downlink and uplink modes of operation and the second device does not transmit signals. An exemplary first wireless communications device, in accordance with some embodiments, includes at least one processor configured to: synchronize operation with a second communications device which is time division duplex (TDD) communications device which uses a TDD communications protocol; and limit transmission of signals by said first communications device using a first communications protocol, which is different from said TDD communications protocol, to time periods during which said second communications device is switching between downlink and uplink modes of operation and the second device does not transmit signals. The exemplary first wireless communications device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 7B, is a second portion of FIG. 7, which illustrates an assembly of modules which can, and in some embodiments is, used in the exemplary multi-mode wireless communications device illustrated in FIG. 6.

DETAILED DESCRIPTION

Figure 1:
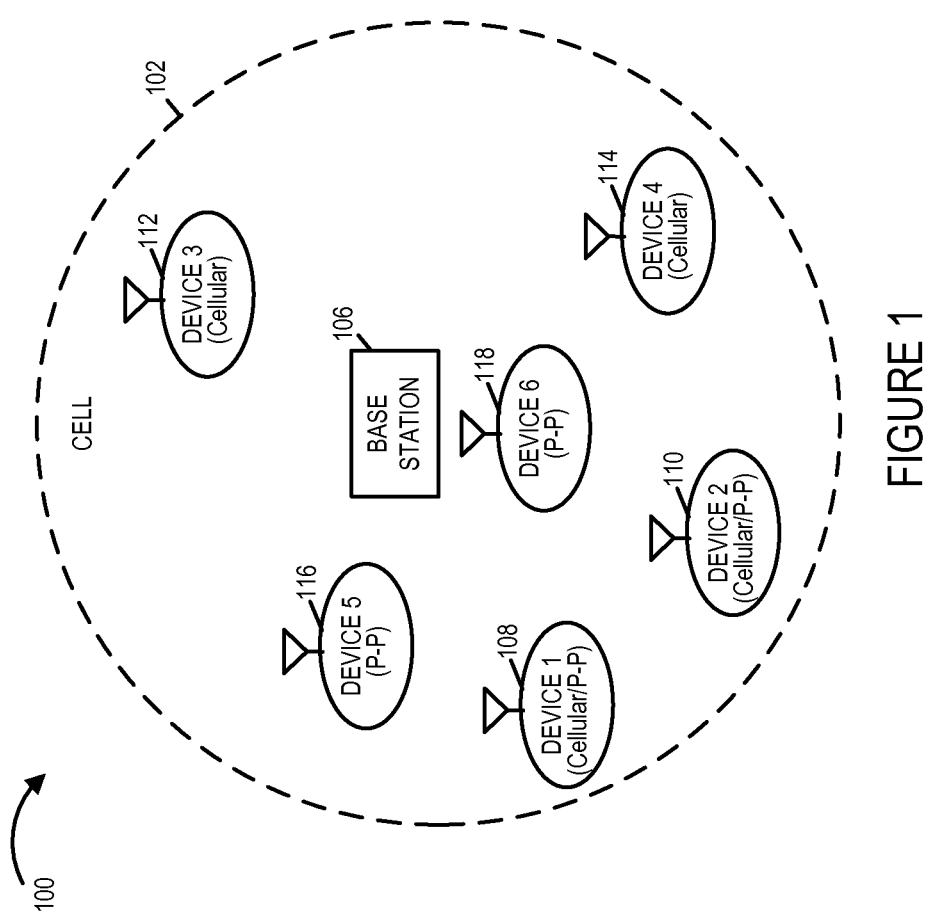
FIG. 1 illustrates an exemplary wireless communications system supporting both access node based communications and peer to peer communications implemented in accordance with various embodiments.

FIG. 1 illustrates an exemplary communications system 100 supporting both base station assisted communications and peer to peer communications implemented in accordance with various embodiments. The communications system 100 includes a cell 102. The coverage area of a given base station is represented by the cell in which the given base station is located. Thus, for purposes of discussion, cell 102 includes the base station coverage area corresponding to base station 106. The system 100 may, and normally does include more than one cell. Each of the cells included in the system 100 include a plurality of communications devices some of which are multi-mode wireless communications devices capable of operating in multiple modes of operation, e.g., cellular/infrastructure mode where communications between devices is facilitated through a base station/access node, and peer to peer mode of operation where devices communicate directly. In the illustrated embodiment cell 102 includes communications devices 108, 110, 112, 114, 116, and 118. Thus at least some communications devices, e.g., devices 108, 110, in the system 100 are multi-mode wireless communications devices, e.g., capable of communicating using multiple modes of communications. Some of the wireless communications devices in system 100, e.g., device 116 and device 118 supports a peer to peer mode of operation, but do not support a cellular/infrastructure mode of operation. Some of the wireless communications devices in system 100, e.g., device 112 and device 114 support a cellular/infrastructure mode of operation, but do not support a peer to peer mode of operation. Some communications devices in system 100, e.g., 108, 110, 112, 114, 116, and 118 are mobile wireless devices, e.g., handheld mobile devices.

In some embodiments the base station 106 is coupled with a big network, e.g., the Internet, via a wired link. The base station 106 provides services to the wireless communications devices 108, 110, 112 and 114, in the geographic area 102 via a wireless spectrum band.

In accordance with one feature of various embodiments, the multi-mode communications devices in the system 100 operate, during a first time period, in a first one of a downlink mode of operation and an uplink mode of operation using a first communications protocol. During a second time period, the multi-mode wireless communications device switches from said first one of said downlink mode of operation and said uplink mode of operation to a second one of said downlink mode of operation and uplink mode of operation. In accordance with one aspect, the multimode device operates in a peer to peer mode of operation during the switching time period, e.g., second time period, and performs at least one of receiving and transmitting a peer to peer signal using a second communications protocol which is different from said first communications protocol. Thus in various embodiments the switching time period is utilized for peer to peer communications, e.g., for communicating peer discovery information to peer devices.

Figure 2:
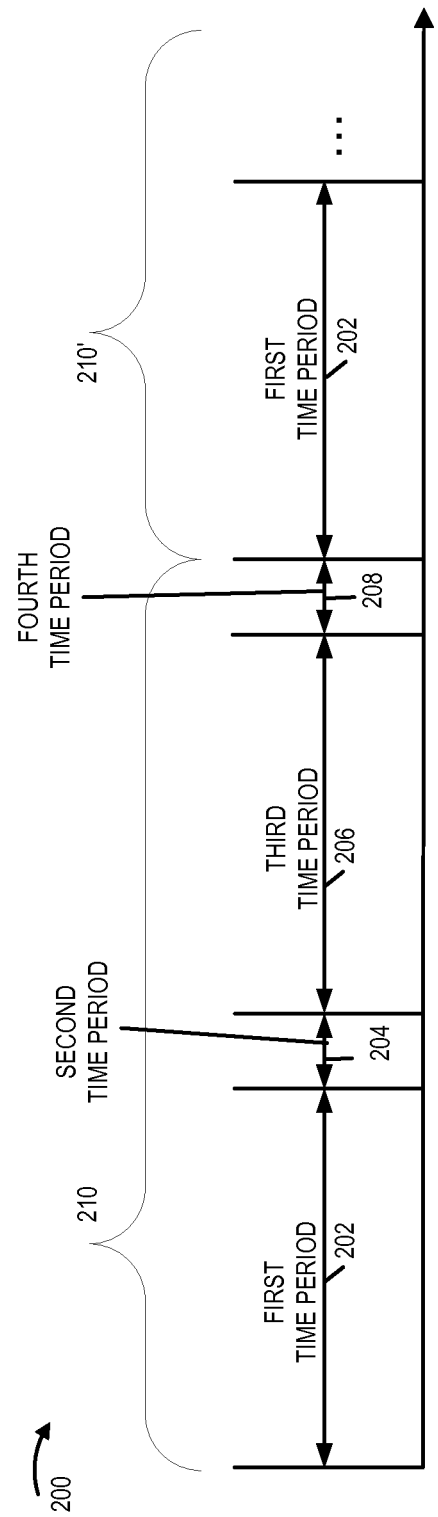
FIG. 2 illustrates an exemplary recurring communications schedule in accordance with some embodiments.

FIG. 2 is a drawing illustrating an exemplary communications schedule 200. The illustrated communications schedule 200 repeats over a recurring interval 210 of different individual time periods including a first time period 202, a second time period 204, a third time period 206 and a fourth time period 208. Thus the first, second, third and fourth time periods are recurring time periods in the stored communications schedule used to control multi-mode wireless communications device, e.g., device 108.

In accordance with one feature of some embodiments an exemplary multi-mode wireless communications device, e.g., device 108, is operated, during the first time period 202, in a first one of a downlink mode of operation and an uplink mode of operation using a first communications protocol.

During the second time period 204, the multi-mode wireless communications device switches from said first one of said downlink mode of operation and said uplink mode of operation to a second one of said downlink mode of operation and uplink mode of operation, and performs at least one of receiving and transmitting peer to peer signals using a second communications protocol which is different from said first communications protocol. In various embodiments the second time period 204 is a time period used for switching between a downlink mode of operation and an uplink mode of operation in accordance with a first communications protocol. During the third time period 206, the multi-mode wireless communications device is operated in the second one of said downlink mode of operation and said uplink mode of operation using said first communications protocol, said third time period 206 following said first and second time periods 202, 204.

During the fourth time period 208 the multi-mode wireless device switches from the second one of said downlink mode of operation and said uplink mode of operation to the first one of said downlink mode of operation and uplink mode of operation.

The second and fourth time periods 204, 208 are sometimes also referred to as the switching time periods or guard time periods. In some embodiments the duration of the second time 204 and/or fourth time period 208 is specified by a predetermined system parameter. In some embodiments the second time period and the fourth time period is at least 10 times the amount of time required for a radio signal to travel twice the radius of the maximum cell size, e.g., twice the radius of cell 102.

Figure 3:
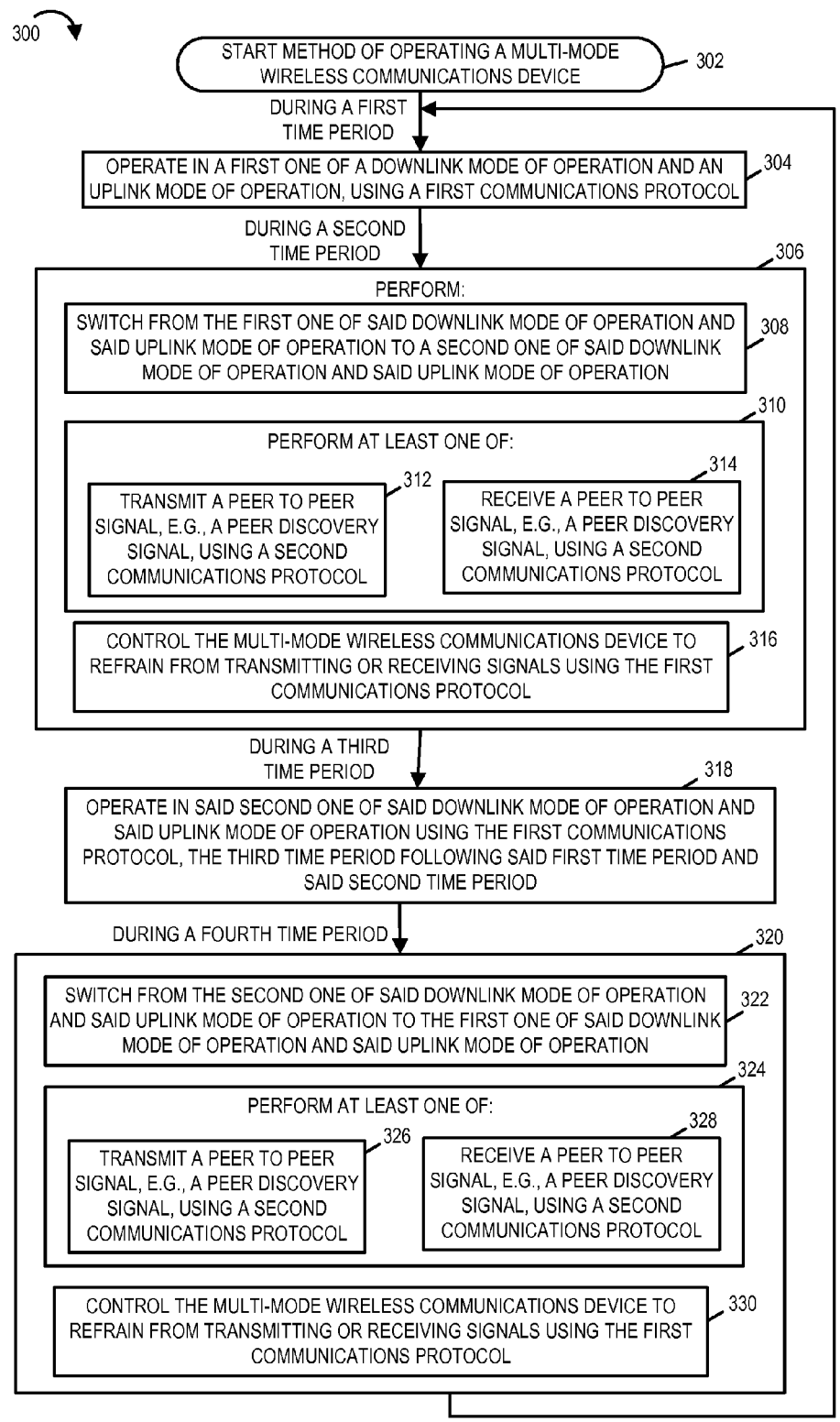
FIG. 3 is a flowchart illustrating an exemplary method of operating a wireless multi-mode communications device, in accordance with one exemplary embodiment.

FIG. 3 is a flowchart 300 of an exemplary method of operating a multi-mode wireless communications device, in accordance with one exemplary embodiment. For the purpose of illustration, consider that multi-mode wireless communications device 108 is implementing the method of flowchart 300. However, it should be appreciated that the method of flowchart 300 can be implemented by other multi-mode wireless communications devices in the exemplary communications network 100 as well. Operation of the exemplary method starts in step 302 where communications device 108 is powered on and initialized. Operation proceeds from start step 302 to step 304.

In step 304, during a first time period, e.g., first time period 202, the multi-mode device operates in a first one of a downlink mode of operation and an uplink mode of operation using a first communications protocol. In various embodiments, operating in a downlink mode of operation includes receiving signals from a base station and wherein operating in an uplink mode of operation includes transmitting signals to a base station. Thus during the first time period the multi-mode device may operate in either the downlink mode of operation or the uplink mode of operation using the first communications protocol. In various embodiments when the multi-mode device communicates with the base station, e.g., during uplink and/or downlink mode of operation, the multi-mode device is said to be operating in an infrastructure or cellular mode of operation.

In some embodiments the first communications protocol is a time division duplexing (TDD) cellular communications protocol. In some embodiments the first communications protocol is a cellular communications protocol used in a communications system having a maximum cell size.

Operation proceeds from step 304 to step 306. Step 306 is performed during a second time period, e.g., second time period 204, and in some embodiments includes steps 308, 310, and 316. In step 308 during the second time period the multi-mode wireless device switches from the first one of said downlink mode of operation and said uplink mode of operation to a second one of said downlink mode of operation and uplink mode of operation. Thus if the multi-mode wireless device operated in the downlink mode during the first time period 202, then during the second time period 204 it switches to the uplink mode of operation.

In step 310 which is also performed during the second time period, at least one of the steps 312 or 314 is performed. In step 312 the multi-mode wireless device transmits a peer to peer signal, e.g., a peer discovery signal, using a second communications protocol which is different from the first communications protocol. Thus in some embodiments, during the second time period 204, e.g., the switching time period, the multi-mode wireless device operates in peer to peer mode of communications using the same common frequency spectrum, and without communicating with the infrastructure base station.

In step 314 the multi-mode wireless device receives a peer to peer signal, e.g., a peer discovery signal, using the second communications protocol. In some embodiments the second communications protocol is a peer to peer communications protocol. In some embodiments the second communications protocol is a WiFi or Bluetooth communications protocol. In various embodiments the second time period 204 is used for communicating, e.g., sending and/or receiving, peer discovery information.

In step 316, the multi-mode wireless device is controlled, during the second time period 204, to refrain from transmitting or receiving signals using the first communications protocol. Thus in some embodiments during the second time period 204, the multi-mode wireless device is controlled to not communicate using the first communications protocol. In some embodiments the switching time period 204 is more than 10 times the amount of time required for a radio signal to travel twice the radius of a maximum size cell, to allow for ample time for meaningful peer to peer signaling but may be even larger, e.g., 70 times in some cases.

Operation proceeds from step 316 to step 318 which is performed during a third time period, e.g., third time period 206. In step 318 the multi-mode wireless device operates in the second one of said downlink mode of operation and said uplink mode of operation using the first communications protocol, the third time period following said first and second time periods. Thus if the multi-mode wireless device operated in the downlink mode during the first time period 202, then during the third time period 206 the multi-mode devices operates in the uplink mode of operation using the first communications protocol.

Operation proceeds from step 318 to step 320. Step 320 is similar to step 306 and is performed during a fourth time period, e.g., fourth time period 208, and in some embodiments includes steps 322, 324, and 330.

In step 322, during the fourth time period the multi-mode wireless device switches from the second one of said downlink mode of operation and said uplink mode of operation to the first one of said downlink mode of operation and uplink mode of operation. Thus during the fourth time period 208 the device switches back to the mode of operation that the device operated in during the first time period 202.

Step 324 is similar to step 310, however during the fourth time period 208, step 324 included in step 320 may not be necessarily performed in all embodiments. Thus, in some embodiments if the multi-mode communications device performs step 310 during the second time period 204, i.e., performs at least one of receiving and transmitting a peer to peer signal, then it does not necessarily perform step 324 during the fourth time period 208. In some other embodiments, step 310 is performed as part of step 306 during the second time period 204 while step 324 is performed as part of step 320 during the fourth time period 208.

In the illustrated embodiment of FIG. 3, step 324 is performed during the fourth time period. In step 324, during the fourth time period the multi-mode device performs at least one of the steps 326 or 328. In step 326 the multi-mode wireless device transmits a peer to peer signal, e.g., a peer discovery signal, using a second communications protocol which is different from the first communications protocol. In step 328 the multi-mode wireless device receives a peer to peer signal, e.g., a peer discovery signal, using the second communications protocol. In some embodiments the fourth time period is used for communicating, e.g., sending and/or receiving, peer discovery information.

In step 330, the multi-mode wireless device is controlled, during the fourth time period 208, to refrain from transmitting or receiving signals using the first communications protocol. Thus during the fourth time period 208, the multi-mode wireless device is controlled to not communicate using the first communications protocol.

Operation proceeds from step 320 back to step 304 and various steps are repeated during their corresponding time periods, i.e., during the first, second, third and fourth time periods, in accordance with the communications schedule. Thus in various embodiments the multi-mode device repeatedly switches between operating in the first one of said downlink mode of operation and said uplink mode of operation using the first communications protocol, performing at least one of receiving and transmitting a peer to peer signals during the second time period, operating during the third time period in the second one of said downlink mode of operation and said uplink mode of operation using the first communications protocol, and then switching back from the second one of said downlink mode of operation and said uplink mode of operation to the first one of said downlink mode of operation and uplink mode of operation during the fourth time period.

Figure 4:
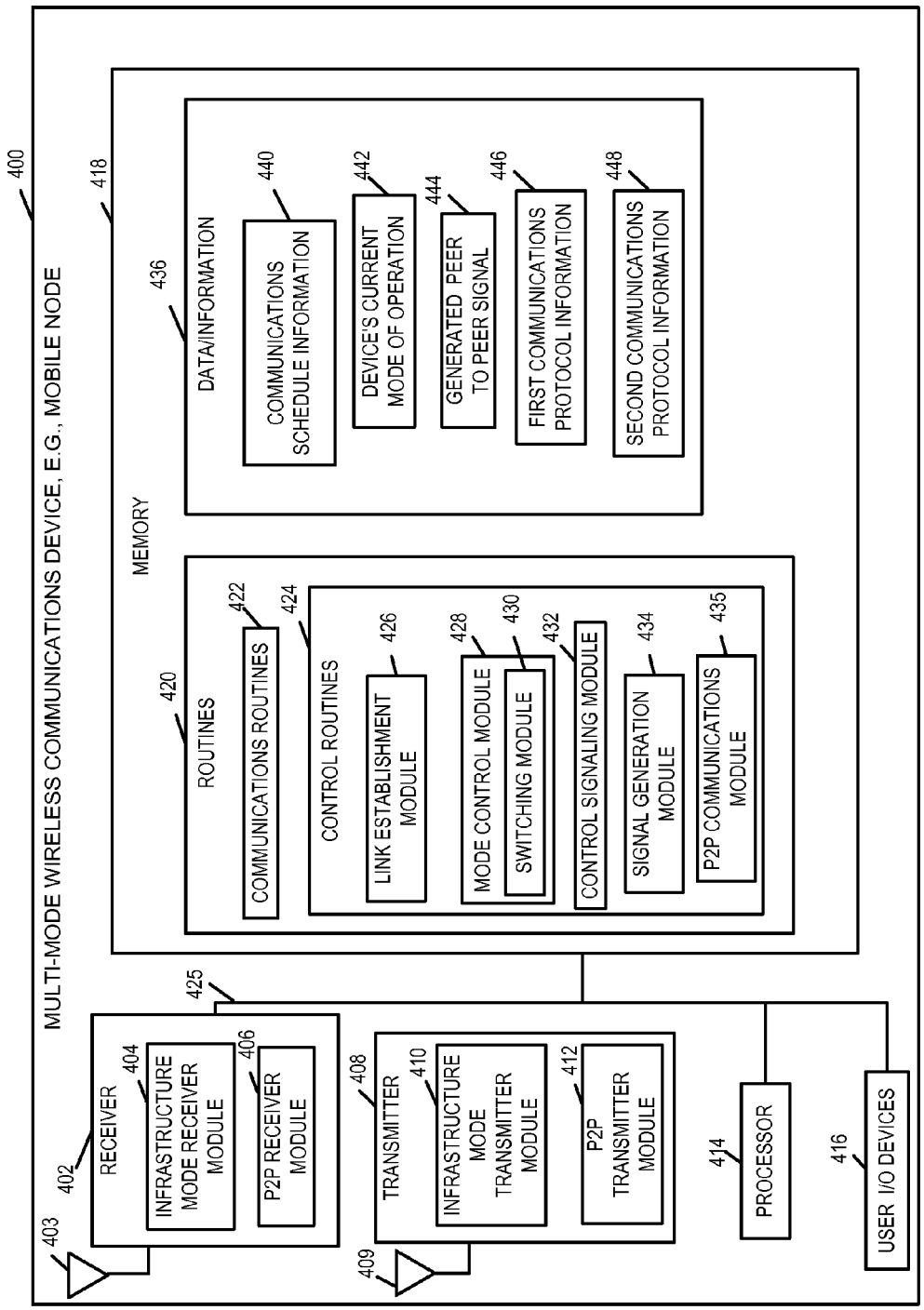
FIG. 4 illustrates an exemplary wireless multi-mode communications device, e.g., multi-mode mobile node, in accordance with various embodiments.

FIG. 4 is a drawing of an exemplary multi-mode wireless communications device 400, e.g., a multi-mode mobile node, in accordance with various embodiments. Exemplary multi-mode wireless communications device 400 can be used as any of the multi-mode devices, e.g., device 108 or device 110, shown in system 100 of FIG. 1. Exemplary multi-mode wireless communications device 400 can, and sometimes does, switch between a downlink mode of operation and an uplink mode of operation. In various embodiments the multi-mode wireless device operates in a peer to peer mode of operation and communicates a peer to peer signal, e.g., a peer discovery signal, during the switching time period, e.g., the time period during which the multi-mode wireless device switches between the downlink mode of operation and the uplink mode of operation.

Wireless multi-mode device 400 includes a receiver module 402, a transmitter module 408, a processor 414, user I/O devices 416, and memory 418 coupled together via a bus 425 over which the various elements may interchange data and information. Memory 418 includes routines 420 and data/information 436. The processor 414, e.g., a CPU, executes the routines 420 and uses the data/information 436 in memory 418 to control the operation of the wireless multi-mode device 400 and implement methods, e.g., a method in accordance with FIG. 300.

Routines 420 include a communications routine 422 and multi-mode wireless device control routines 424. The communications routine 422 implements the various communications protocols used by the wireless multi-mode communications device 400. Control routines 424 include a link establishment module 426, a peer to peer signal generation module 434, a mode control module 428, a control signaling module 432, and a peer to peer communications module 435. Mode control module 428 includes switching module 430.

Data/information 436 includes communications schedule information 440, wireless multi-mode device's current mode of operation information 442, and generated peer to peer signals 444. Data/information 436 may include other information used for the wireless multi-mode communications device's operation.

Receiver module 402, e.g., an OFDM receiver, includes an infrastructure mode receiver module 404 and a peer to peer (P2P) receiver module 406. The receiver 402 is coupled to receive antenna 403 via which the device 400 receives signals. When the multi-mode device 400 operates in the infrastructure/cellular mode, the infrastructure mode receiver module 404 receives signals from base stations. The receiver module 404 can, and sometimes does, receive control signals and user data signals from the base station. The P2P receiver module 406 receives signals peer to peer signals, e.g., directly from a peer device, such as peer discovery signals, peer to peer traffic signals, peer to peer session establishment signals.

Transmitter 408, e.g., an OFDM transmitter, includes an infrastructure mode transmitter module 410 and a P2P transmitter module 412, and is coupled to transmit antenna 409 via which the device 400 transmits signals. In some embodiments, the same antenna is used by the transmitter and receiver. When the multi-mode device 400 operates in the infrastructure/cellular mode, the infrastructure mode transmitter module 408 transmits signals to the base station using first communications protocol, to base stations. The P2P transmitter module 412 transmits peer to peer signals, e.g., directly to a peer device, such as peer discovery signals, peer to peer traffic signals, peer to peer session establishment signals.

User I/O devices 416 include, e.g., keypad, keyboard, switches, mouse, microphone, speaker, display, etc. User I/O devices 416 are used for operations including inputting user data, accessing output user data, and controlling at least some functions and operations of the multi-mode communications device 400, e.g., initiating a communications session.

Link establishment module 426 establishes a communications link with a base station when the multi-mode communications device operates in a cellular/infrastructure mode. Mode control module 428 controls the multi-mode device 400 to operate in different modes during different time periods in accordance with the communications schedule information 440. Thus the mode control module 428 controls the device 400 to operate in a first one of a downlink mode of operation and an uplink mode of operation using a first communications protocol, during the first time period 202. The switching module 430 controls the device 400 to switch from said first one of said downlink mode of operation and uplink mode of operation to a second one of said downlink mode of operation and uplink mode of operation during the second time period 204, and during the fourth time period 208 the switching module 430 controls the device 400 to switch from the second one of said downlink mode of operation and said uplink mode of operation to the first one of said downlink mode of operation and uplink mode of operation.

The mode control module 428 further controls the device 400, during the second time period, to perform at least one of receiving and transmitting a peer to peer signal using a second communications protocol which is different from said first communications protocol. The mode control module 428 further controls the device 400 to operate during a third time period in said second one of said downlink mode of operation and said uplink mode of operation using said first communications protocol.

The mode control module 428 further controls the device 400 to control said multi-mode wireless device to refrain from transmitting or receiving signals using said first communications protocol during said second time period 204.

In various embodiments the first, second, third and fourth time periods are recurring time periods in the stored communications schedule 440 used to control multi-mode wireless communications device 400. In some embodiments the mode control module 428 further controls the device 400 to repeatedly switch between operating during a first time period, performing at least one of receiving and transmitting a peer to peer signal during a second time period, operating during a third time period, and performing at least one of receiving and transmitting a peer to peer signal during a fourth time period.

Control signaling module 432 generates control signals communicated from the device 400. Generated control signals include, e.g., power control signals, timing control signals, control channel report signals such as SNR reports, etc.

Signal generation module 434 generates various signals in accordance with different protocols, e.g., first and second communications protocol, supported by the multi-mode device 400. The signal generation module 434 generates peer to peer signals as well as signals which are communicated to the base stations. The P2P communications module 435 is responsible for establishing and maintaining peer to peer communications with other devices, e.g., peer to peer devices, or other multi-mode communications devices.

Communications schedule information 440 includes stored communications schedule such as the one illustrated in FIG. 2. The multi-mode communications device 400 uses communications schedule information 440 to operate in different modes of operation and/or communicate using different protocols supported by the device 400. Device's current mode of operation 442 includes information indicating multi-mode device 400's current mode of operation. Generated peer to peer signal 444 is an output of the signal generation module 434, e.g., a peer discovery signal. First communications protocol information 446 includes information regarding the first communications protocol supported by the multi-mode device 400 while the second communications protocol information 448 includes information regarding the second communications protocol supported by the multi-mode device 400.

The processor 414, e.g., a CPU, executes the routines 420 and uses the data/information 436 in memory 418 to control the operation of the wireless multi-mode device 400. In some embodiments the processor 414 is configured to: operate, during a first time period, in a first one of a downlink mode of operation and an uplink mode of operation using a first communications protocol; switch, during a second time period, from said first one of said downlink mode of operation and said uplink mode of operation to a second one of said downlink mode of operation and uplink mode of operation, and perform at least one of receiving and transmitting a peer to peer signal using a second communications protocol which is different from said first communications protocol; and operate, during a third time period, in said second one of said downlink mode of operation and said uplink mode of operation using said first communications protocol, said third time period following said first and second time periods.

In some embodiments the processor 414 is further configured to control said multi-mode wireless communications device 400 to refrain from transmitting or receiving signals using said first communications protocol during said second time period.

In some embodiments the processor 414 is further configured to control said multi-mode device, as part of controlling the multi-mode device to operate in a downlink mode of operation, to receive signals from a base station, and control said multi-mode device as part of controlling the multi-mode device to operate in an uplink mode of operation, to transmit signals to a base station.

In some embodiments the processor 414 is further configured to control the multi-mode wireless communications device to perform at least one of transmitting a peer discovery signal and receiving a peer discovery signal, as part of controlling the device to perform at least one of receiving and transmitting a peer to peer signal.

In some embodiments the processor 414 is further configured to control said multi-mode device to repeatedly switch between (i) operating during a first time period in the first one of a downlink mode of operation and an uplink mode of operation using a first communications protocol, (ii) switch, during a second time period, from said first one of said downlink mode of operation and said uplink mode of operation to a second one of said downlink mode of operation and uplink mode of operation, and perform at least one of receiving and transmitting a peer to peer signal using a second communications protocol which is different from said first communications protocol, and (iii) operate, during a third time period, in said second one of said downlink mode of operation and said uplink mode of operation using said first communications protocol, said third time period following said first and second time periods.

Figure 5:
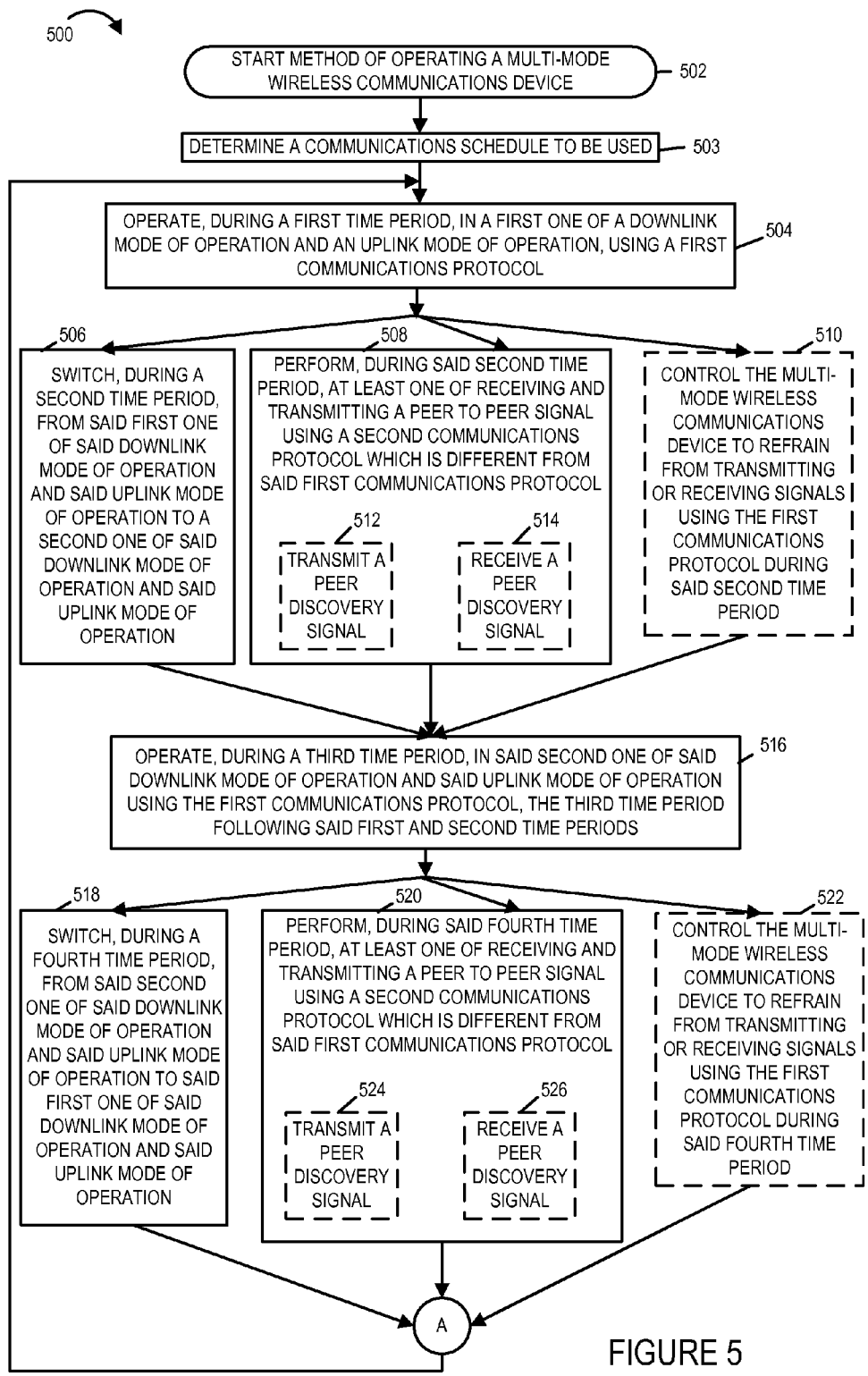
FIG. 5 is a flowchart of an exemplary method of operating a multi-mode wireless communications device in accordance with various embodiments.

FIG. 5 is a flowchart 500 of an exemplary method of operating a multi-mode wireless communications device in accordance with various embodiments. The multi-mode wireless communications device is, e.g., device 108 of system 100 of FIG. 1. Operation of the exemplary method starts in step 502, where the multi-mode wireless communications device is powered on and initialized. Operation proceeds from start step 502 to step 503, in which the multi-mode wireless communications device determines a communications schedule to use. Operation proceeds from step 503 to step 504, in which the multi-mode wireless communications device operates, during a first time period, in a first one of a downlink mode of operation and an uplink mode of operation, using a first communications protocol. In some embodiments, the first communications protocol is a time division duplexing (TDD) cellular communications protocol. Operation proceeds from step 504 to steps 506 and 508. In some embodiments, operation also proceeds from step 504 to step 510. In step 506, the multi-mode wireless communications device switches, during a second time period, from said first one of said downlink mode of operation and said uplink mode of operation, to a second one of said downlink mode of operation and said uplink mode of operation. In various embodiments, the second time period is a time period used for switching between the downlink mode of operation and said uplink mode of operation in accordance with the first communications protocol. In step 508, the multi-mode wireless communications device performs, during said second time period, at least one of receiving and transmitting a peer to peer signal using a second communications protocol which is different from said first communications protocol. In some embodiments, step 508 may, and sometimes does, include one or both of steps 512 and 514. In step 512, the multi-mode wireless communications device transmits a peer discovery signal. In step 514, the multi-mode wireless communications device receives a peer discovery signal.

Returning to step 510, in step 510, the multi-mode wireless communications device controls the multi-mode wireless communications device to refrain from transmitting or receiving signals using the first communications protocol during said second time period. Operation proceeds from steps 506, 508 and 510 to step 516.

In step 516 the multi-mode wireless communications device operates, during a third period of time, in said second one of said uplink or downlink mode of operation using the first communications protocol, the third time period following said first and second time periods. Operation proceeds from step 516 to steps 518 and 520. In some embodiments, operation proceeds from step 518 to step 522.

In step 518 the multi-mode wireless communications device switches, during a fourth time period from said second one of said downlink mode of operation and said uplink mode of operation to said first one of said downlink mode of operation and said uplink mode of operation. In step 520, the multi-mode wireless communications device performs, during said fourth time period at least one of receiving and transmitting a peer to peer signal using a second communications protocol which is different from said first communications protocol. In some embodiments, step 520 may, and sometimes does, include one or both of steps 524 and 526. In step 524 the multi-mode wireless communications device transmits a peer discovery signal. In step 526 the multi-mode wireless communications device receives a peer discovery signal. In step 522 the multi-mode wireless communications device controls the multi-mode wireless communications device to refrain from transmitting or receiving signals using the first communications protocol during said fourth time period.

Operation proceeds from steps 518, 520, and 522 to step 504 where the multi-mode communications device operates, during another a first time period in the first one of a downlink mode of operation and an uplink mode of operation using a first communications protocol.

In some embodiments, the first communications protocol is a cellular communication protocol used in a communications system having a maximum cell size, and the second time period is at least 10 times the amount of time required for a radio signal to travel twice the radius of the maximum cell size. In various embodiments, the duration of the second time period is specified by a predetermined system parameter.

In some embodiments, the first, second and third time periods are recurring time periods in a stored communications schedule used to control the multi-mode wireless communications device. In some embodiments, the first, second, third, and fourth time periods are recurring time periods in a stored communications schedule used to control the multi-mode wireless communications device. In some embodiments, a fourth time period is the same duration as a second time period. In various embodiments, the multi-mode repeatedly switches between different communications operations corresponding to different time intervals in accordance with a stored communications schedule. For example, the multi-mode wireless communications device performs multiple iterations of flowchart 500 in accordance with a stored communications schedule, and performs different communications operations during the different time intervals. In some embodiments, the duration of the first time period is the same the duration of the third time period. In other embodiments, the duration of the first time period is different than the duration of the third time period.

In one exemplary embodiment, the first time period corresponding to a downlink time period of a cellular network, the second time period corresponds to a time interval used for switching from downlink to uplink communications in the cellular network, the third time period corresponds to an uplink time period for the cellular network, and the fourth time period corresponds to a time interval used for switching from uplink to downlink communications in the cellular network. In various embodiments, the second and fourth time periods are intentionally set to be longer in duration than the time needed to accomplish switching between downlink and uplink communications in the cellular network. The second and fourth time periods are advantageously utilized additionally for supporting peer to peer communications.

In some embodiments, operating in a downlink mode of operation includes receiving signals from a base station and operating in an uplink mode of operation includes transmitting signals to a base station.

In some embodiments, the first communications protocol is compliant with 3GPP TS 36.211 V10.20 (2011-06). In some embodiments, the second communications protocol is a WiFi or Bluetooth communications protocol.

In some embodiments, step 503 includes retrieving stored system configuration information corresponding to the location of the multi-mode wireless communications device or corresponding to an identified base station from which a signal was detected. In some embodiments, the multi-mode wireless communications device is pre-configured in accordance with a particular communications schedule. In some embodiments, step 503 includes receiving one or more signals from a base station communicating communications schedule information, and/or information used to determine communications schedule information. In some embodiments, the communications schedule is selected from a plurality of alternative schedules, e.g., based on a received signal from a base station or based on location information. For example the multi-mode wireless communications may operate at different times in different networks which use different communications schedules including different duration of the second time interval, e.g., to accommodate different maximum cell sizes, to accommodate different expected loads on the cellular network, to accommodate different traffic balances between downlink and uplink, to accommodate different amounts of peer to peer traffic, and/or to accommodate different priorities between cellular traffic and peer to peer traffic.

In some embodiments, communications schedule structure is selected from a plurality of alternative communications schedule structures, e.g., based on a received signal from a base station or based on location information. For example, a first alternative structure is a recurring pattern of 5 downlink time slots, followed by a downlink to uplink switching interval, followed by 5 uplink time slots, followed by an uplink to downlink switching interval. A second alternative structure is a recurring pattern of 5 downlink time slots, followed by a downlink to uplink switching interval, followed by 2 uplink time slots, followed by an uplink to downlink switching interval.

In some embodiments, downlink/uplink switching time period, e.g., specifying second and fourth time period durations, is selected from a plurality of alternative time durations, e.g., based on a received signal from a base station or based on location information.

Figure 6:
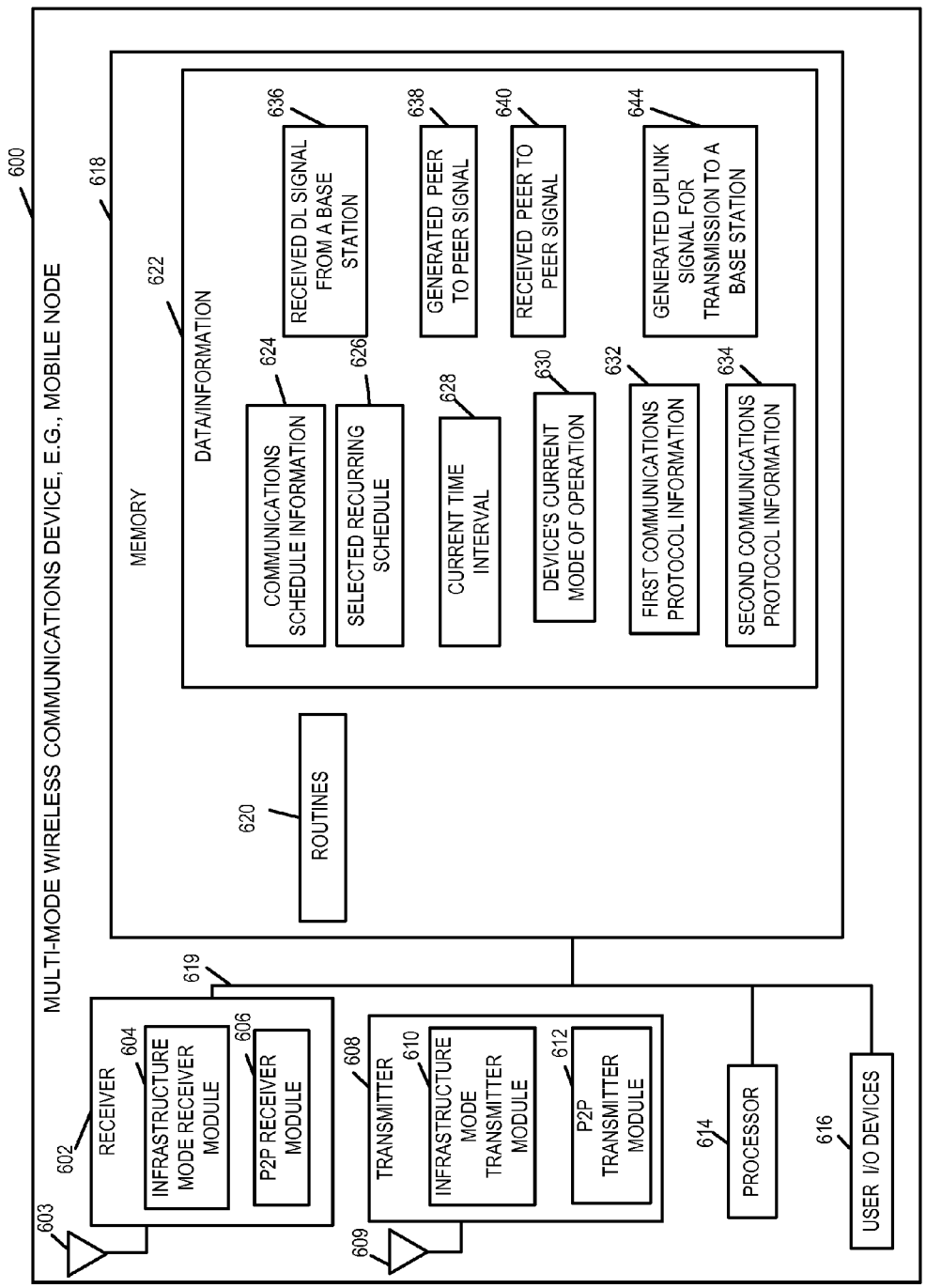
FIG. 6 is drawing of an exemplary multi-mode wireless communications device, e.g., a mobile node, in accordance with an exemplary embodiment.

FIG. 6 is drawing of an exemplary multi-mode wireless communications device 600, e.g., a mobile node, in accordance with an exemplary embodiment. Exemplary multi-mode wireless communications device 600 is, e.g., one of the multi-mode wireless communications devices (108, 110) of system 100 of FIG. 1. Exemplary multi-mode wireless communications device 600 may, and sometimes does, implement a method in accordance with flowchart 500 of FIG. 5.

Multi-mode wireless communications device 600 includes a receiver 602, a transmitter 608, a processor 614, e.g., a CPU, user I/O devices 616, e.g., display, speaker, microphone, keypad, touch screen, etc., and a memory 618 coupled together via a bus 619 over which the various elements (602, 608, 614, 616, 618) may interchange data and information. Receiver 602 includes an infrastructure mode receiver module 604 and a peer to peer receiver module 606. Receiver 602 is coupled to receive antenna 603 via which the multi-mode device may receive downlink signals from a base station and peer to peer signals from other devices. Transmitter 608 includes an infrastructure mode transmitter module 610 and a peer to peer transmitter module 612. Transmitter 608 is coupled to transmit antenna 609 via which the multi-mode wireless communications device may transmit uplink signals to a base station and peer to peer signal to other devices. Exemplary peer to peer signals include peer discovery signals.

In some embodiments, one or more of: the receiver 602, transmitter 608, user I/O devices 616, a portion of receiver 602, a portion of transmitter 608, and a portion of user I/O devices 616 is located internal to the processor 614.

Memory 618 includes routines 620 and data/information 622. Data/information 622 includes communications schedule information 624, selected recurring schedule 626, current time interval 628, multi-mode wireless communications device's current mode of operation 630, first communications protocol information 632, second communications protocol information 634, received downlink signal from a base station 636, generated peer to peer signal 638, received peer to peer signal 640 and generated uplink signal for transmission to a base station 644.

In some embodiments, processor 614 is configured to: control said multi-mode wireless communications device to operate, during a first time period, in a first one of a downlink mode of operation and an uplink mode of operation using a first communications protocol; switch, during a second time period, from said first one of said downlink mode of operation and said uplink mode of operation to a second one of said downlink mode of operation and uplink mode of operation; perform, during said second time period, at least one of receiving and transmitting a peer to peer signal using a second communications protocol which is different from said first communications protocol; and control said multi-mode communications device to operate, during a third time period, in said second one of said downlink mode of operation and said uplink mode of operation using said first communications protocol, said third time period following said first and second time periods. In various embodiments, said second time period is a time period used for switching between said downlink mode of operation and said uplink mode of operation in accordance with said first communications protocol.

In some embodiments, processor 614 is further configured to control said multi-mode wireless communications device to refrain from transmitting or receiving signals using said first communications protocol during said second time period.

In various embodiments, the first communications protocol is a time division duplexing (TDD) cellular communications protocol. In some embodiments, processor 614 is configured to perform at least one of transmitting a peer discovery signal and receiving a peer discovery signal, as part of being configured to perform at least one of receiving and transmitting a peer to peer signal.

In some embodiments, said first communications protocol is a cellular communications protocol used in a communications system having a maximum cell size; and the second time period is at least 10 times the amount of time required for a radio signal to travel twice the radius of the maximum cell size.

In various embodiments, the duration of said second time period is specified by a system parameter, e.g., a predetermined system parameter. In some embodiments, the value of the system parameter specifying the duration of the second time period is one of a plurality of predetermined alternative values. In some embodiments, information communicating or identifying the value of system parameter specifying the duration of the second time period is communicated via a signal from a base station. In some embodiments, the value of system parameter specifying the duration of the second time period is selected based on the location of multi-mode wireless communications device including processor 614 or based on an identified base station in the vicinity of the multi-mode wireless communications device including processor 614.

In some embodiments, first, second and third time periods are recurring time periods in a stored communications schedule used to control multi-mode wireless communications device, and processor 614 is further configured to control said multi-mode wireless communications device to repeatedly switch between different communications operations corresponding to different time intervals in accordance with said stored communications schedule. Processor 614 is configured to receive signals from a base station, as part of being configured to operate in a downlink mode of operation, and processor 614 is configured to transmit signals to a base station, as part of being configured to operating in an uplink mode of operation.

In some embodiments, the first communications protocol is compliant with 3GPP TS 36.211 V10.2.0 (2011-06) and processor 614 is configured to support the first communications protocol. In various embodiments, the second communications protocol is a WiFi or Bluetooth communications protocol, and processor 614 is configured to support the second communications protocol.

Figure 7A:
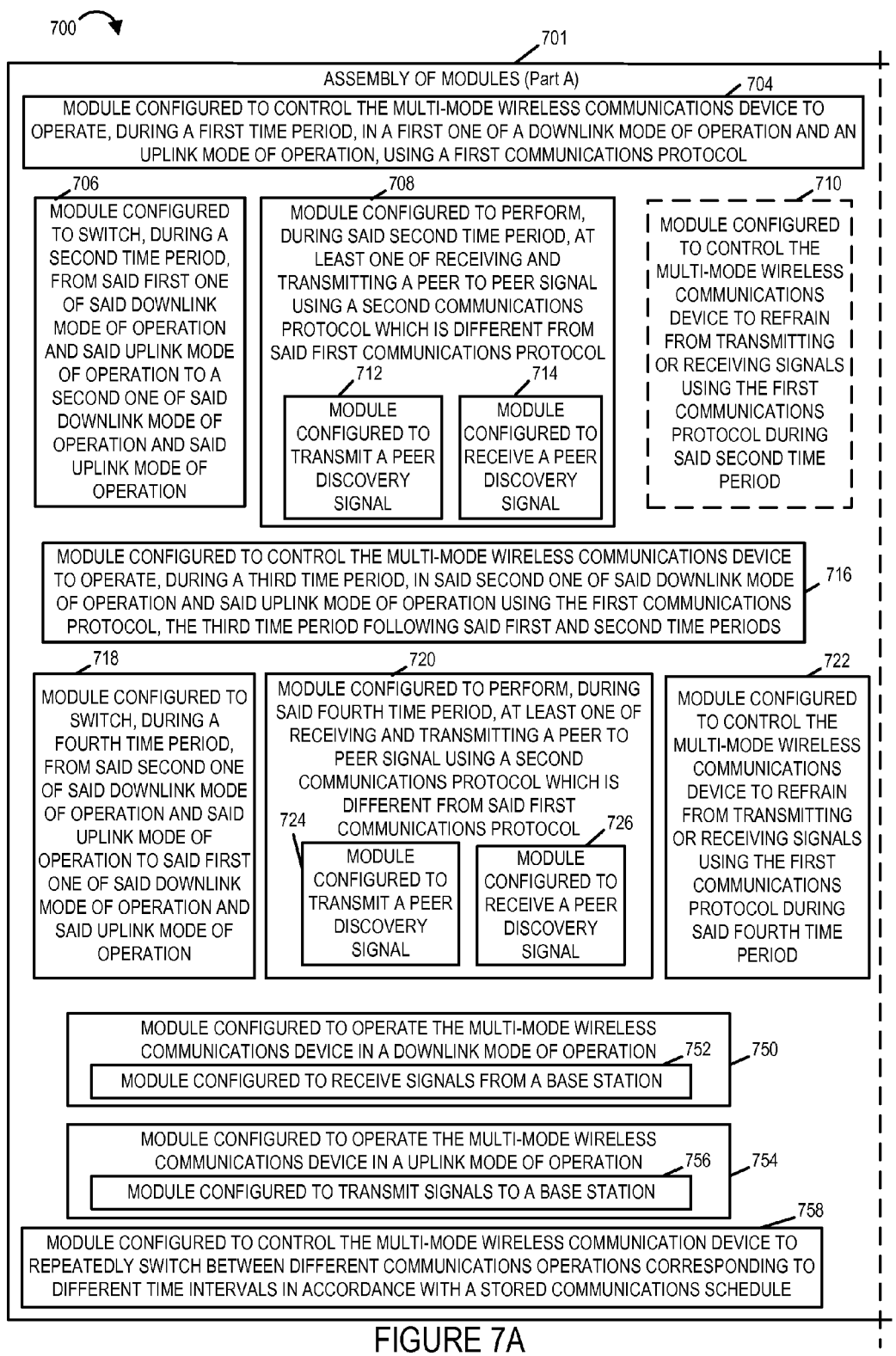
FIG. 7A is a first portion of FIG. 7, which illustrates an assembly of modules which can, and in some embodiments is, used in the exemplary multi-mode wireless communications device illustrated in FIG. 6.

FIG. 7, comprising the combination of FIG. 7A and FIG. 7B, illustrates an assembly of modules 700 which can, and in some embodiments is, used in the exemplary multi-mode wireless communications device 600 illustrated in FIG. 6. The modules in the assembly 700 can be implemented in hardware within the processor 614 of FIG. 6, e.g., as individual circuits. Alternatively, the modules may be implemented in software and stored in the memory 618 of multi-mode wireless communications device 600 shown in FIG. 6. In some such embodiments, the assembly of modules 700 is included in routines 620 of memory 618 of device 600 of FIG. 6. While shown in the FIG. 6 embodiment as a single processor, e.g., computer, it should be appreciated that the processor 614 may be implemented as one or more processors, e.g., computers. When implemented in software the modules include code, which when executed by the processor, configure the processor, e.g., computer, 614 to implement the function corresponding to the module. In some embodiments, processor 614 is configured to implement each of the modules of the assembly of modules 700. In embodiments where the assembly of modules 700 is stored in the memory 618, the memory 618 is a computer program product comprising a computer readable medium, e.g., a non-transitory computer readable medium, comprising code, e.g., individual code for each module, for causing at least one computer, e.g., processor 614, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the multi-mode wireless communications device 600 or elements therein such as the processor 614, to perform the functions of the corresponding steps illustrated and/or described in the method of flowchart 500 of FIG. 5.

Assembly of modules 700 comprises the combination of Part A 701 and Part B 705. Assembly of modules 700 includes a module 704 configured to control the multi-mode wireless communications device to operate during a first time period, in a first one of a downlink mode of operation and an uplink mode of operation, using a first communications protocol, a module 706 configured to switch during a second time period from said first one of said downlink mode of operation and said uplink mode of operation to a second one of said downlink mode of operation and said uplink mode of operation, and a module 708 configured to perform during said second time period, at least one of receiving and transmitting a peer to peer signal using a second communications protocol, which is different from said first communications protocol. Module 708 includes a module 712 configured to transmit a peer discovery signal and a module 714 configured to receive a peer discovery signal. In various embodiments, assembly of modules 700 further includes a module 710 configured to control the multi-mode wireless communications device to refrain from transmitting or receiving signals using the first communications protocol during said second time period.

Assembly of modules 700 further includes a module 716 configured to control the multi-mode wireless communications device to operate during a third time period, in said second one of said downlink mode of operation and said uplink mode of operation using the first communications protocol, the third time period following the first and second time periods. Assembly of modules 700 further includes a module 718 configured to switch during a fourth time period from said second one of said downlink mode of operation and said uplink mode of operation to said first one of said downlink mode of operation and said uplink mode of operation, and a module 720 configured to perform during said fourth time period, at least one of receiving and transmitting a peer to peer signal using a second communications protocol, which is different from said first communications protocol. Module 720 includes a module 724 configured to transmit a peer discovery signal and a module 726 configured to receive a peer discovery signal. In various embodiments, assembly of modules 700 further includes a module 722 configured to control the multi-mode wireless communications device to refrain from transmitting or receiving signals using the first communications protocol during said fourth time period.

Assembly of modules 700 further includes a module 750 configured to operate the multi-mode wireless communications device in a downlink mode of operation, a module 754 configured to operate the multi-mode communication device in an uplink mode of operation, and a module 758 configured to control the multi-mode wireless communications device to repeatedly switch between different communications operation corresponding to different time intervals in accordance with a stored communications schedule, e.g., a stored recurring communications schedule including first time intervals, second time intervals, third time intervals and fourth time intervals. Module 750 includes a module 752 configured to receive signals from a base station, and module 754 includes a module 756 configured to transmit signals to a base station.

Assembly of modules 700 further includes a module 703 configured to determine a communications schedule to be used by the multi-mode wireless communications device. In some embodiments, assembly of modules 700 further includes one or more or all of: a module 760 configured to identify a predetermined recurring schedule from among a plurality of alternative predetermined recurring schedules based on information received from a base station, a module 762 configured to determine the duration of a second time period from a specified predetermined system parameter, a module 764 configured to determine the duration of a fourth time period from a specified predetermined system parameter, a module 766 configured to receive a signal from a base station communicating information used to determine the duration of a second time period, a module 768 configured to receive a signal from a base station communicating information used to determine the duration of a fourth time period, a module 770 configured to determine a recurring communications schedule structure based on a received signal from a base station, a module 772 configured to receive a signal from a base station communicating information used to determine an implemented recurring communications schedule structure from among a plurality of alternative recurring schedule structures.

In various embodiments, the second time period is a time period used for switching between said downlink mode of operation and said uplink mode of operation in accordance with said first communications protocol. In some embodiments, the first communications protocol is a time division duplexing (TDD) cellular communication protocol. In various embodiments, the first communications protocol is a cellular communications protocol using a communications system having a maximum cell size and the second time period is at least 10 times the amount of time required for a radio signal to travel twice the radius of the maximum cell size. In some embodiments, the duration of the second time period is specified by a predetermined parameter. In various embodiments, the duration of the fourth time period is the same as the duration of the second time period.

In some embodiments, the first, second, and third time periods are recurring time periods in a stored communications schedule used to control the multi-mode wireless communications device. In some embodiments, the first, second, third, and fourth time periods are recurring time periods in a stored communications schedule used to control the multi-mode wireless communications device.

In some embodiments, the first communications protocol is compliant with 3GPP TS 36.211 V10.2.0 (2011-06). In some embodiments, the second communications protocol is a WiFi or Bluetooth communications protocol.

Figure 8:
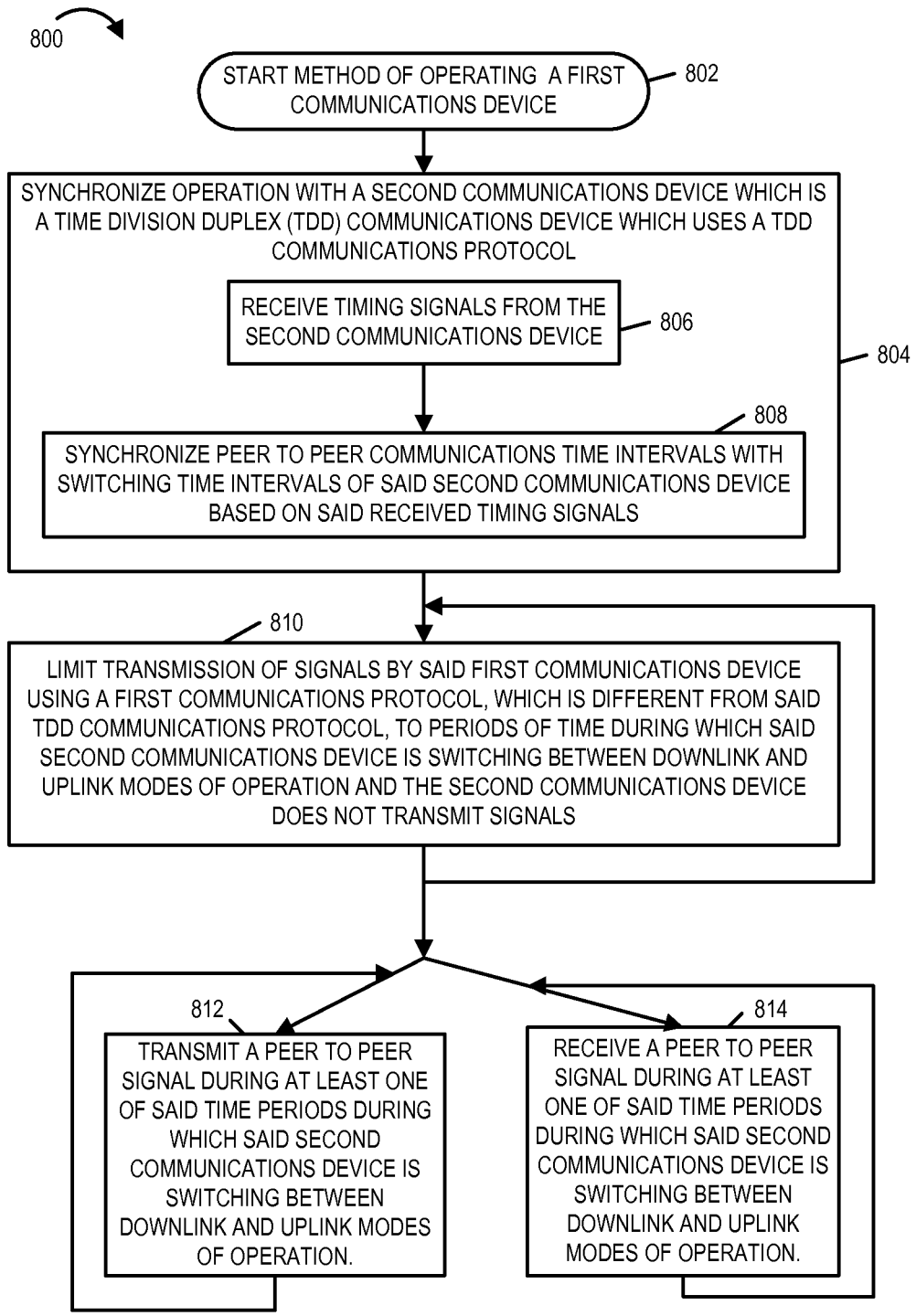
FIG. 8 is a flowchart of an exemplary method of operating a first communications device, e.g., a wireless communications device supporting peer to peer communications, in accordance with an exemplary embodiment.

FIG. 8 is a flowchart 800 of an exemplary method of operating a first communications device in accordance with an exemplary embodiment. First communications device is, e.g., device 116 of system 100 of FIG. 1. Operation of the exemplary method starts in step 802 where the first communications device is powered on and initialized. Operation proceeds from start step 802 to step 804. In step 804 the first communications device synchronizes operation with a second communications device which is a time division duplex (TDD) communications device which uses a TDD communications protocol. Step 804 includes step 806 and step 808. In step 806 the first communications device receives timing signals, e.g., beacon signals and/or pilot signals, from the second communications device. Operation proceeds from step 806 to step 808, in which the first communications device synchronizes peer to peer communications time intervals with switching time intervals of said second communications device based on said received timing signals. Operation proceeds from step 804 to step 810.

In step 810 the first communications device limits transmission of signals by said first communications using a first communications protocol, which is different from said TDD protocol, to periods of time during which said second communications device is switching between downlink and uplink modes of operation and the second communications device does not transmit signals. In various embodiments, the first communications protocol is a peer to peer communications protocol. Step 810 is performed on an ongoing basis. Operation proceeds from step 810 to step 812 and step 814.

In step 812 the first communications device transmits a peer to peer signal during at least one of said time periods during which said second communications device is switching between downlink and uplink modes of operation. Step 812 is performed on an ongoing basis.

In step 814 the first communications device receives a peer to peer signal during at least one of said time periods during which said second communications device is switching between downlink and uplink modes of operation. Step 814 is performed on an ongoing basis.

In some embodiments, the first communications device does not transmit signals using said TDD communications protocol. In various embodiments, the second communications device is a base station of a cellular network, and the first communications device is a peer to peer communications device which supports direct device to device communications but does not support communication through the base station.

Figure 9:
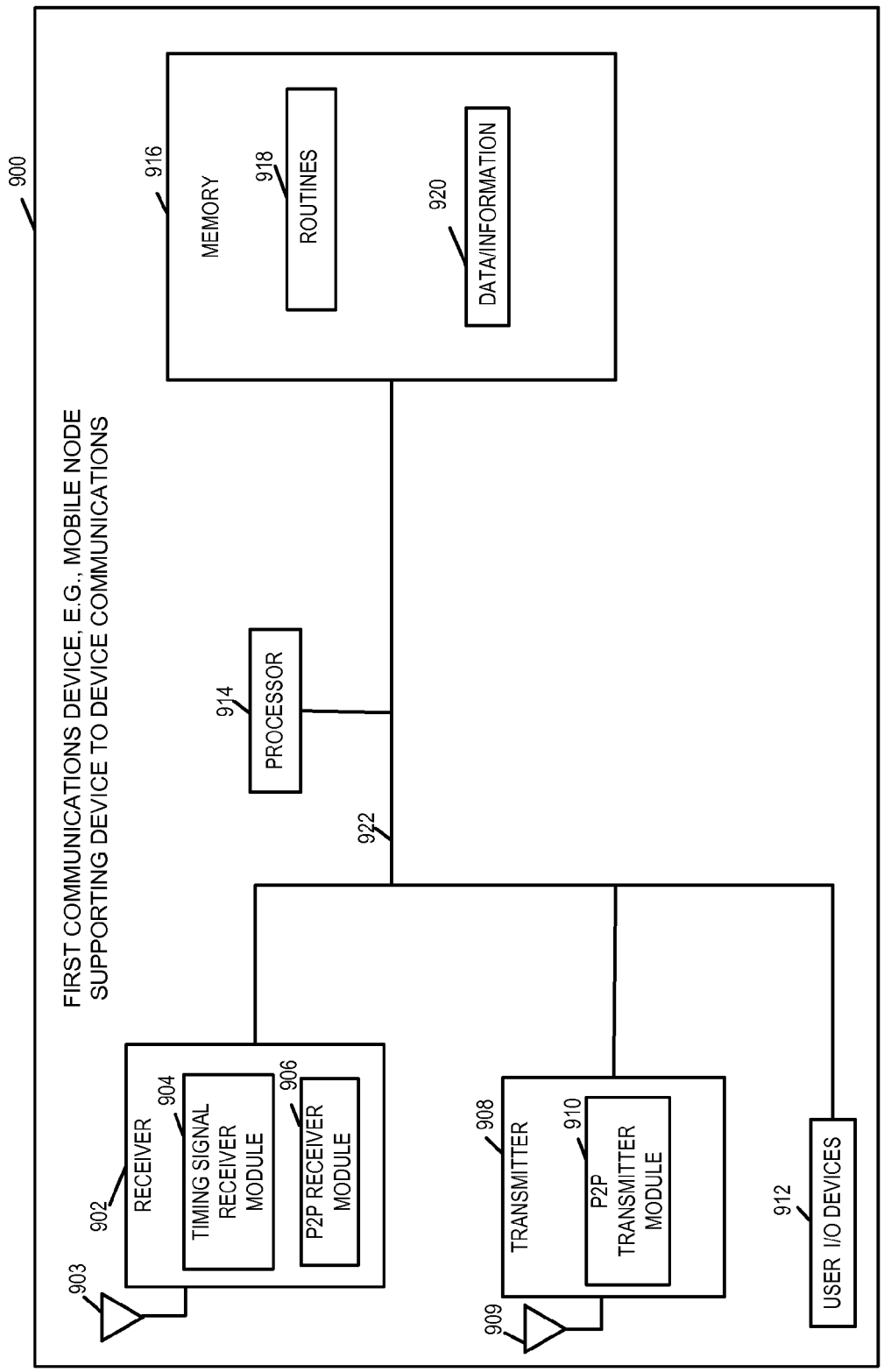
FIG. 9 is a drawing of an exemplary first communications device, e.g., a mobile node supporting device to device communications, in accordance with an exemplary embodiment.

FIG. 9 is a drawing of an exemplary first communications device 900, e.g., a mobile node supporting device to device communications, in accordance with an exemplary embodiment. First communications device 900 is, e.g., one of device 116 and 118 of system 100 of FIG. 1. Exemplary first communications device 900 may, and sometimes does, implement a method in accordance with flowchart 800 of FIG. 8.

First communications device 900 includes a receiver 902, a transmitter 908, user I/O devices 912, a processor 914, e.g., a CPU, and a memory 916 coupled together via a bus 922 via which the various elements (902, 908, 912, 914, 916) may exchange data and information. Receiver 902 includes a timing signal receiver module 904 and a peer to peer receiver module 906. Receiver 902 is coupled to receive antenna 903 via which the receiver module 902 may receive signals, e.g., timing signals from a base station and peer to peer signals, e.g., peer discovery signals, from devices supporting peer to peer communications. Transmitter 908 includes a peer to peer transmitter module 910 for transmitting peer to peer signals, e.g., a peer discovery signal, via antenna 909. User I/O devices 912 include, e.g., a display, a keypad, a touch-screen, a microphone, speaker, etc. In some embodiments, one or more of: the receiver 902, transmitter 908, user I/O devices 912, a portion of receiver 902, a portion of transmitter 908, and a portion of user I/O devices 912 is located internal to the processor 914. Memory 916 includes routines 918 and data/information 920.

In some embodiments, processor 914 is configured to: synchronize operation with a second communications device which is time division duplex (TDD) communications device which uses a TDD communications protocol and limit transmission of signals by said first communications device using a first communications protocol, which is different from said TDD communications protocol, to time periods during which said second communications device is switching between downlink and uplink modes of operation and the second device does not transmit signals. In some such embodiments, the first communications protocol is a peer to peer communications protocol. In some such embodiments, processor 914 is further configured to transmit a peer to peer signal during at least one of said time periods during which said second communications device is switching between downlink and uplink modes of operation. In some such embodiments, processor 914 is further configured to receive a peer to peer signal, e.g., from a third communications device, during at least one of said time periods during which said second communications device is switching between downlink and uplink modes of operation.

In some embodiments, the first communications device including processor 914 does not transmit signals using said TDD communications protocol. In various embodiments, said second communications device is a base station of a cellular network, and the first communications device including processor 914 is a peer to peer communications device which supports direct device to device communications but does not support communications through said base station.

In some embodiments, the second communications device is a base station, and processor 914 is configured to: receive timing signals, e.g., beacons and/or pilots, from the second communications device and synchronizing peer to peer communications time intervals with switching time intervals of said second communications device based on said received timing signals, as part of being configured to synchronizing operation with the second communications device.

Figure 10:
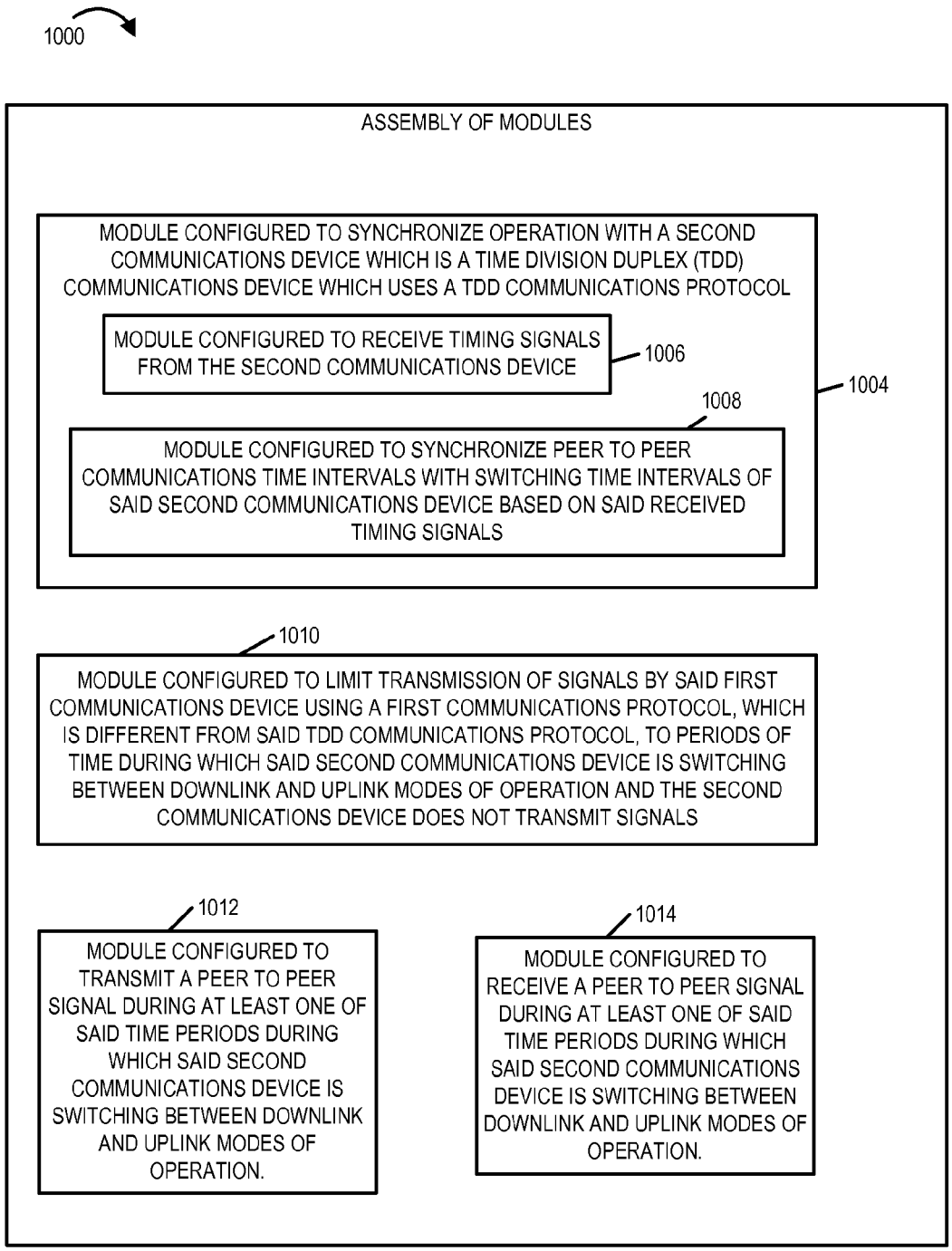
FIG. 10 is an assembly of modules which can, and in some embodiments is, used in the exemplary first communications device illustrated in FIG. 9.

FIG. 10 is an assembly of modules 1000 which can, and in some embodiments is, used in the exemplary first communications device 900 illustrated in FIG. 9. The modules in the assembly 1000 can be implemented in hardware within the processor 914 of FIG. 9, e.g., as individual circuits. Alternatively, the modules may be implemented in software and stored in the memory 916 of first communications device 900 shown in FIG. 9. In some such embodiments, the assembly of modules 1000 is included in routines 918 of memory 916 of device 900 of FIG. 9. While shown in the FIG. 9 embodiment as a single processor, e.g., computer, it should be appreciated that the processor 914 may be implemented as one or more processors, e.g., computers. When implemented in software the modules include code, which when executed by the processor, configure the processor, e.g., computer, 914 to implement the function corresponding to the module. In some embodiments, processor 914 is configured to implement each of the modules of the assembly of modules 1000. In embodiments where the assembly of modules 1000 is stored in the memory 916, the memory 916 is a computer program product comprising a computer readable medium, e.g., a non-transitory computer readable medium, comprising code, e.g., individual code for each module, for causing at least one computer, e.g., processor 914, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 1-control and/or configure the first communications device 900 or elements therein such as the processor 914, to perform the functions of the corresponding steps illustrated and/or described in the method of flowchart 800 of FIG. 8.

FIG. 10 is an assembly of modules 1000 in accordance with an exemplary embodiment. Assembly of modules 1000 includes a module 1004 configured to synchronize operation with a second communications device, which is a time division duplex (TDD) communications device which uses a TDD communications protocol, a module 1010 configured to limit transmission of signals by the first communications device using a first communications protocol, which is different from said TDD communications protocol, to periods of time during which said second communications device is switching between downlink and uplink modes of operation and the second communications device does not transmit signals, a module 1012 configured to transmit a peer to peer signal during at least one of said time periods during which said second communications device is switching between downlink and uplink modes of operation, and a module 1014 configured to receive a peer to peer signal during at least one of said time periods during which said second communications device is switching between downlink and uplink modes of operation. Module 1004 configured to synchronize operation with a second communications device includes a module 1006 configured to receive timing signals, e.g., beacons and/or pilot signals, from the second communications device and a module 1008 configured to synchronize peer to peer communications time intervals with switching time intervals of said second communications device based on said received timing signals.

In some embodiments, the first communications protocol is a peer to peer communications protocol. In various embodiments, the first communications device does not transmit signals using the TDD communications protocol. In some embodiments, the second communications device is a base station of a cellular network and the first communications device is a peer to peer communications device which supports direct device to device communications but does not support communications through the base station.

Figure 11:
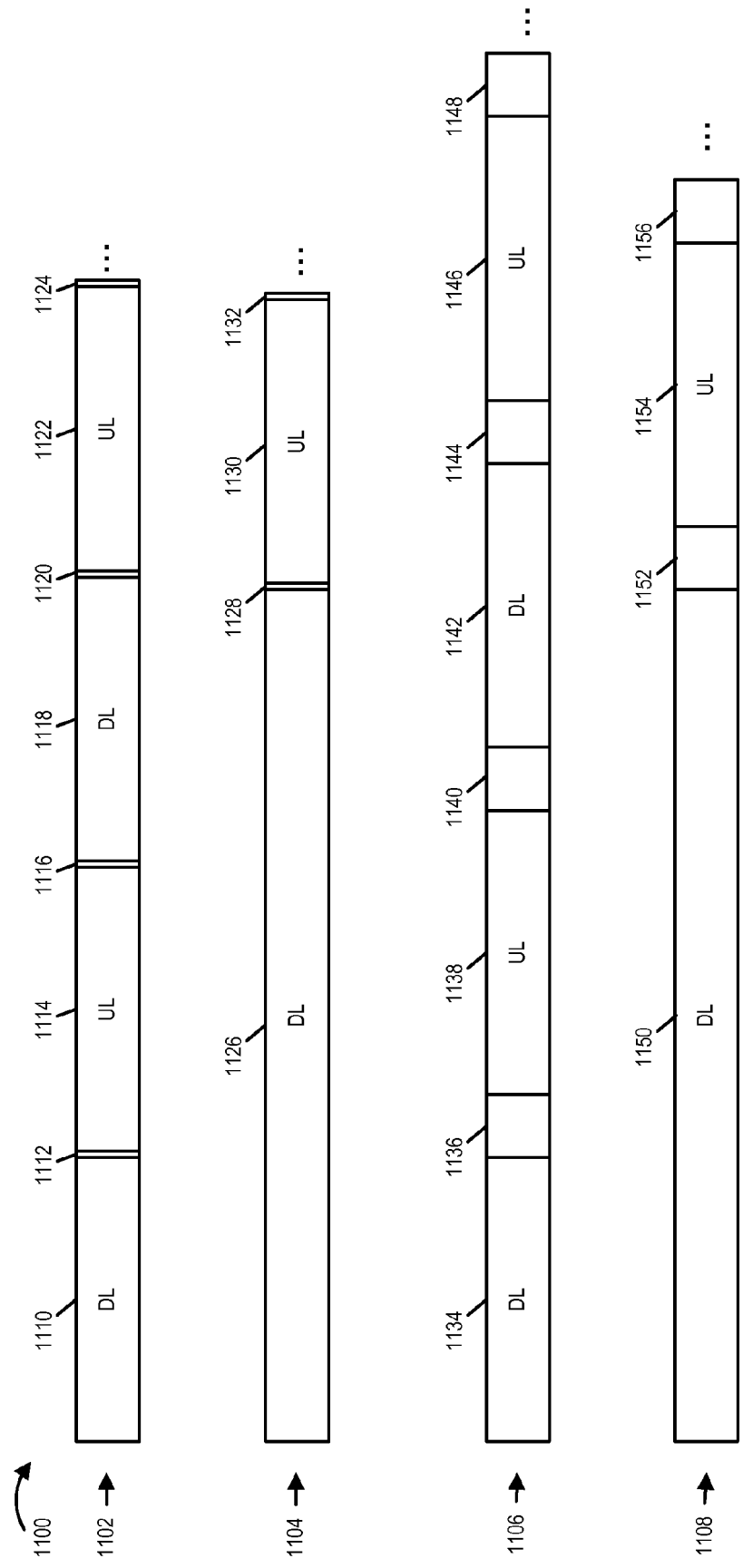
FIG. 11 is a drawing 1100 illustrating exemplary alternative configurations for TDD systems.

FIG. 11 is a drawing 1100 illustrating exemplary alternative configurations for TDD systems. Consider that drawing 1102 represents a first configuration for a TDD system supporting downlink and uplink signaling, in which the maximum radius of a cell is expected to be 1 km, and in which the switching time interval is sufficient to satisfy the round trip turnaround delay expected, but the switching time is not excessive. Drawing 1102 identifies different time periods in a recurring communications schedule corresponding to a frequency spectrum. Time period 1110 is for TDD downlink (DL) signaling; time period 1112 is gap period to accommodate switching between DL and Uplink (UL); time period 1114 is for TDD UL signaling; time period 1116 is gap period to accommodate switching between UL and DL; time period 1118 is for TDD DL signaling; time period 1120 is gap period to accommodate switching between DL and UL; time period 1122 is for TDD UL signaling; time period 1124 is gap period to accommodate switching between UL and DL.

Consider that drawing 1104 represents a second configuration for a TDD system supporting downlink and uplink signaling, in which the maximum radius of a cell is expected to be 1 km, and in which the switching time is sufficient to satisfy the round trip turnaround delay expected, but the switching time interval is not excessive. Time period 1126 is for TDD DL signaling; time period 1128 is gap period to accommodate switching between DL and UL; time period 1130 is for TDD UL signaling; time period 1132 is gap period to accommodate switching between UL and DL.

In some embodiments there are many, e.g., 10, alternative configuration structures corresponding to different patterns of frame use of uplink and downlink.

Consider that drawing 1106 represents a first configuration for a TDD system supporting downlink and uplink signaling, in which the maximum radius of a cell is expected to be 10 km, and in which the switching time interval is sufficient to satisfy the round trip time delay expected, but the switching time is not excessive. Time period 1134 is for TDD DL signaling; time period 1136 is gap period to accommodate switching between DL and UL; time period 1138 is for TDD UL signaling; time period 1140 is gap period to accommodate switching between UL and DL; time period 1142 is for TDD DL signaling; time period 1144 is gap period to accommodate switching between DL and UL; time period 1146 is for TDD UL signaling; time period 1148 is gap period to accommodate switching between UL and DL.

Consider that drawing 1108 represents a second configuration for a TDD system supporting downlink and uplink signaling, in which the maximum radius of a cell is expected to be 10 km, and in which the switching time is sufficient to satisfy the round trip time delay expected, but the switching time interval is not excessive. Time period 1150 is for TDD DL signaling; time period 1152 is gap period to accommodate switching between DL and UL; time period 1154 is for TDD UL signaling; time period 1156 is gap period to accommodate switching between UL and DL.

In accordance with a feature of some embodiments, the switching time interval is intentionally configured to a larger value than is needed to satisfy the round trip time delay requirements with regard to the TDD downlink and uplink signaling. For example, consider that the TDD system includes cells in which the maximum cell radius is expected to 1 km. Instead of configuring to meet the minimum requirements, e.g., selecting configuration 1102 or configuration 1104, the system is configured to use configuration 1106 or configuration 1108, which have excessively long switching intervals from the perspective of the TDD downlink/uplink. During the excessively long switching intervals, e.g., 1136, 1140, 1144, 1148 or 1152, 1156, peer to peer communications, e.g., direct device to device communications, are performed by wireless communications devices which support the peer to peer communications protocol. In various embodiments, the peer to peer communications includes peer discovery signaling. In various embodiments, the peer to peer communications uses a different communications protocol than the TDD UL/DL communications protocol, occur. Thus the frequency spectrum is shared on a time division basis among downlink, uplink, and peer to peer communications.

In some embodiments, the gap period used for supporting peer to peer communications corresponds to at least 10 times the RTT for cellular signaling based on the maximum cell. In one example, a gap time corresponding to a 100 Km radius cell is used for supporting peer to peer communications where the maximum cell radius is 1 Km.

Figure 12:
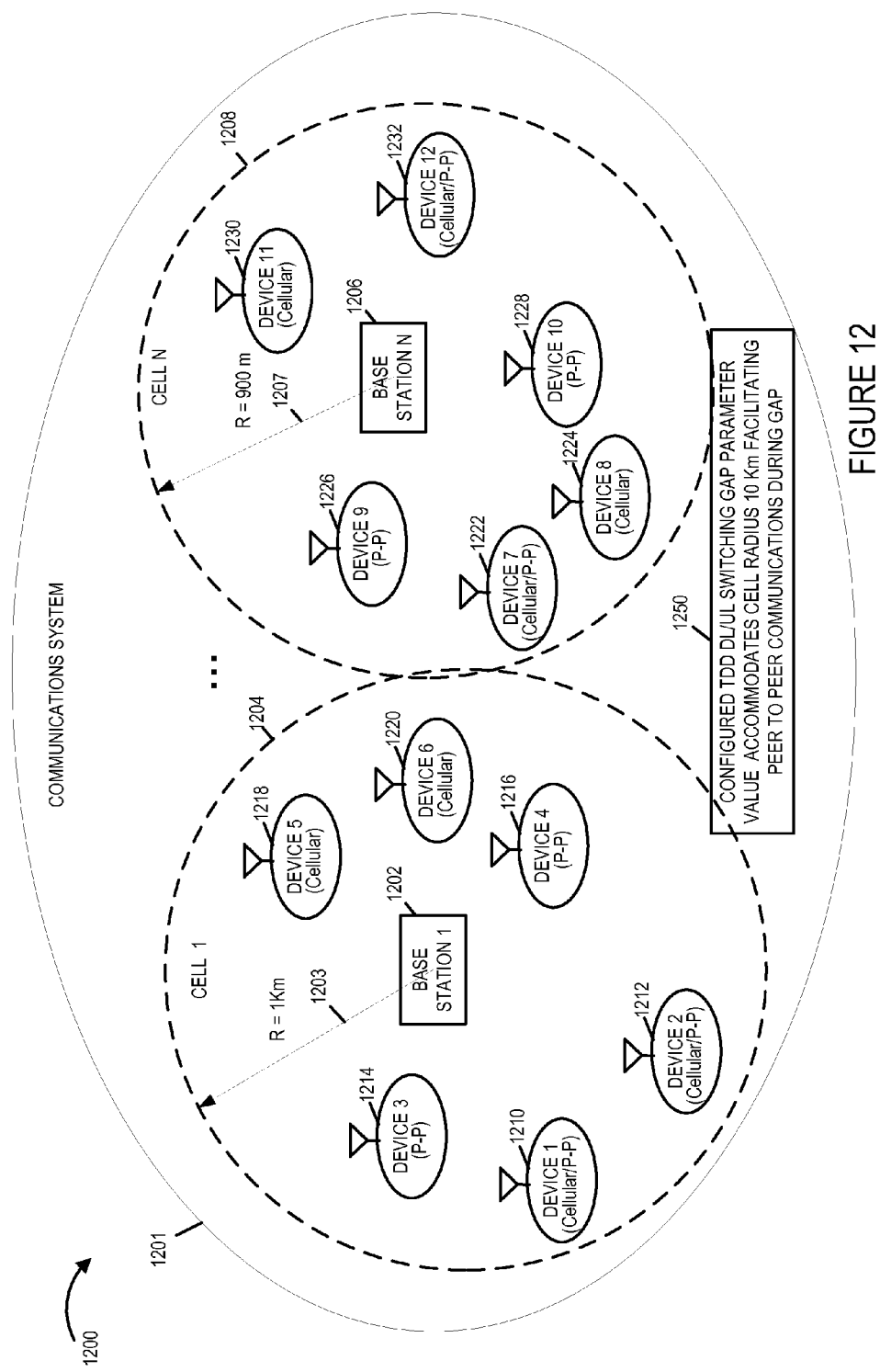
FIG. 12 is a drawing illustrating an exemplary communications system supporting TDD downlink, TDD uplink, and peer to peer communications in the same spectrum in accordance with an exemplary embodiment.

FIG. 12 is a drawing 1200 illustrating an exemplary communications system 1201 supporting TDD downlink, TDD uplink, and peer to peer communications in the same spectrum in accordance with an exemplary embodiment. System 1201 includes a plurality of base stations (base station 1 1202, . . . , base station N 1206) with corresponding cellular coverage areas (cell 1 1204, . . . , cell N 1208), respectively. Cell 1 1204 has a radius of 1 Km, while cell N has a radius of 900 m. The largest cellular radius in system 1201 is 1 Km. In system 1201 the TDD DL/UL switching gap parameter is configured to accommodate cell radius as large as 10 Km, facilitating peer to peer communications during the gap, as indicated by block 1250.

System 1201 includes a plurality of wireless communications devices (device 1 1210, device 2 1212, device 3 1214, device 4 1216, device 5 1218, device 6 1220, device 7 1222, device 8 1224, device 9 1226, device 10 1228, device 11 1230, device 12 1232. Devices (1210, 1212, 1222, 1232) are multi-mode mobile wireless communications devices supporting cellular TDD communications and peer to peer communications, e.g., direct device to device communications. Devices (1210, 1212, 1222, 1232) are, e.g., multi-mode mobile wireless communications devices implementing a method in accordance with FIG. 2 and/or FIG. 5 and/or implemented in accordance with FIG. 3, FIG. 4, FIG. 6 and/or FIG. 7. Devices (1214, 1216, 1226, 1228) are mobile wireless communications devices supporting peer to peer communications, e.g., direct device to device communications, but do not support cellular communications with the base stations. Devices (1214, 1216, 1226, 1228) are, e.g., mobile wireless communications devices implementing a method in accordance with FIG. 8 and/or implemented in accordance with FIG. 9 and/or FIG. 10. Devices (1218, 1220, 1224, 1230) are mobile wireless communications devices supporting cellular communications but do not support peer to peer communications.

Figure 13:
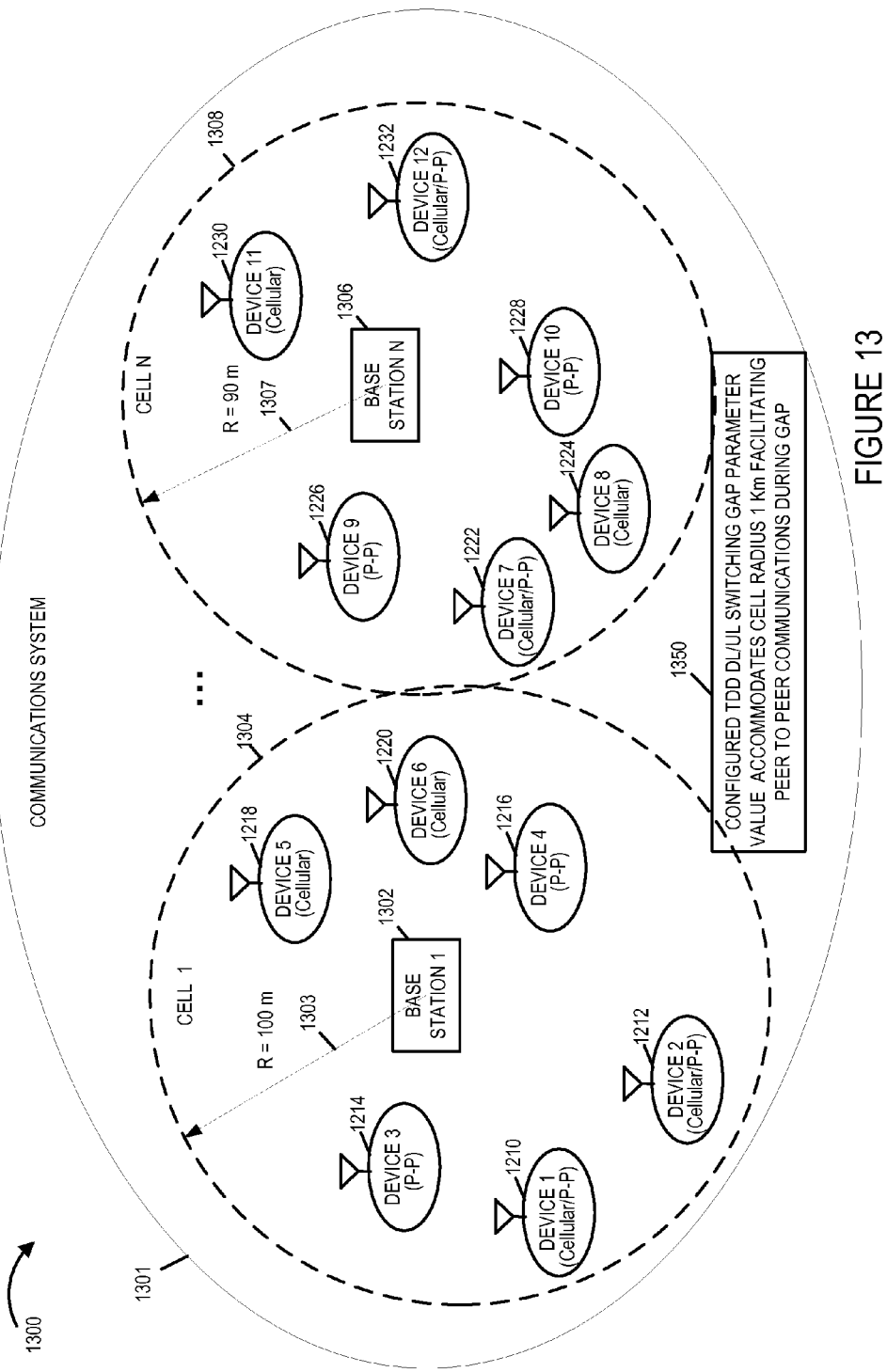
FIG. 13 is a drawing illustrating an exemplary communications system supporting TDD downlink, TDD uplink, and peer to peer communications in the same spectrum in accordance with an exemplary embodiment.

FIG. 13 is a drawing 1300 illustrating an exemplary communications system 1301 supporting TDD downlink, TDD uplink, and peer to peer communications in the same spectrum in accordance with an exemplary embodiment. System 1301 includes a plurality of base stations (base station 1 1302, . . . , base station N 1306) with corresponding cellular coverage areas (cell 1 1304, . . . , cell N 1308), respectively. Cell 1 1304 has a radius of 100 m, while cell N has a radius of 90 m. The largest cellular radius in system 1301 is 100 m. In system 1301 the TDD DL/UL switching gap parameter is configured to accommodate cell radius as large as 1 Km, facilitating peer to peer communications during the gap, as indicated by block 1350.

System 1301 includes a plurality of wireless communications devices (device 1 1210, device 2 1212, device 3 1214, device 4 1216, device 5 1218, device 6 1220, device 7 1222, device 8 1224, device 9 1226, device 10 1228, device 11 1230, device 12 1232), which are the same mobile wireless communications described in FIG. 12. Thus devices in FIG. 12 may, and sometimes do, move from system 1201 to system 1301 and reconfigure, e.g., implementing the communications schedule in the particular system in which the device is currently located. Reconfiguration may, and sometimes does, include determining a switching gap parameter to be used, which may be, and sometimes is different.

Various features and/or aspects of some, but not necessary all, embodiments, will be further described. Methods and apparatus for implementing and/or operating a multi-mode wireless communications device are described. In some embodiments the multi-mode wireless communications device, e.g., may be implemented as an access terminal, cell phone or another portable device. In various embodiments, a multimode wireless communications device supports both infrastructure communication and peer to peer communication Infrastructure communication includes communication through a network element such as an access point and can involve uplink and/or downlink signaling. The access point may be, and in some embodiments is, a base station. In other embodiments the access point may connect to a residential service, such as cable TV, and be located in a home appliance, such as a set-top box.

In accordance with some aspects, a multi-mode device uses a time periods corresponding to a period of time allotted by a TDD timing schedule for switching between uplink and downlink modes of operation, for peer to peer communication, e.g., discovery and or other peer to peer signaling. To facilitate the use of the time period used for switching between uplink and downlink modes of operation, the time period scheduled for switching between uplink and downlink modes is set longer than that required by the size of the maximum cell and/or the physical time to implement the switching time in the multi-mode device. Thus, by specifying and/or communicating a large time period to be used for the switching operation, a window of time is made available for peer to peer signaling without interfering with infrastructure communication. This is because the switching time used for switching between downlink and uplink communication is a time period in which wireless signals are not transmitted in accordance with the first communications protocol.

In some embodiments the first communications protocol is a cellular communications protocol. The system, in some embodiments in which the method is implemented is a communications system having a maximum cell size. The cell size may affect the time period allocated for switching which may take into consideration the maximum round trip time required for a signal to travel to a base station in a cell and back to a wireless terminal. In some embodiments, the switching time is configured to be larger than that required by the cellular communications protocol taking into consideration the maximum cell size in the system. In some embodiments the second time period is at least 10 times the amount of time required for a radio signal to travel twice the radius of the maximum cell size. However, in other embodiments it is even larger, e.g., 50 or 100 times the amount of time required for a wireless signal to traverse twice the radius of a cell. This allows time for P2P signaling without, in many cases, requiring changes to a cellular communications protocol which may be used as the first communications protocol.

An infrastructure communication protocol, which may be used as the first communications protocol, may be a cellular network communication protocol, e.g., a CDMA or OFDM based protocol used for cellular communications, e.g., telephone calls. A peer to peer communication protocol may be one of a plurality of peer to peer communications protocols and may include a WiFi based protocol or another protocol. For purposes of discussion, the cellular network protocol may be considered a first communication protocol and a peer to peer communication protocol may be considered a second communication protocol.

One aspect is directed to a method of operating a multi-mode wireless communications device that includes operating, during a first time period, in a first one of a downlink mode of operation and an uplink mode of operation using a first communications protocol; switching, during a second time period, from said first one of said downlink mode of operation and said uplink mode of operation to a second one of said downlink mode of operation and uplink mode of operation, performing at least one of receiving and transmitting a peer to peer signal using a second communications protocol which is different from said first communications protocol; and operating, during a third time period, in said second one of said downlink mode of operation and said uplink mode of operation using said first communications protocol, said third time period following said first and second time periods. The second time period may be a switching time period in which the multimode device switches between uplink and downlink signaling or vice versa. The second time period may have a duration specified by a system parameter that may be communicated, e.g., broadcast, by one or more access points in the system. The parameter may be the same for multiple or all access points, e.g., base stations in the system.

Methods and apparatus for supporting peer to peer and infrastructure, e.g., cellular, communication in a multimode device which can operate in a cellular system are described. Peer to peer communication occurs within a switching time period during which infrastructure signal does not occur and devices switch between an uplink and a downlink mode of infrastructure operation. The time period set for the switching time period is intentionally set larger, e.g., 10, 50, 100 or even more times larger than that required based on the maximum cell size. Thus, a peer to peer communications period can be introduced into a TDD system and use the same frequency band as the TDD system in a manner that can remain compliant with one or more cellular communications protocols which allow for a switching time period, e.g., which can be set in the system by a parameter, during which devices refrain from transmitting infrastructure signals.

Various embodiments are directed to a device which does not use a TDD communications protocol to communicate but which synchronizes with TDD communications devices to determine when to transmit using a different protocol, e.g., a peer to peer communications protocol. For example, some embodiments are directed to a method of operating a first communications device, the method comprising: synchronizing operation with a second communications device which is time division duplex (TDD) communications device which uses a TDD communications protocol; and limiting transmission of signals by said first communications device using a first communications protocol, which is different from said TDD communications protocol, to time periods during which said second communications device is switching between downlink and uplink modes of operation and the second device does not transmit signals.

In some embodiments, a TDD LTE system is intentionally configured with extended length UL/DL switching periods, e.g., longer than is needed for LTE signaling. Peer to peer communications including discovery signaling is performed during the induced gaps in LTE operation. In some embodiments, using a TDD-LTE standard, there are S frames during which a transition between the uplink and downlink communication occurs. These frames include guard periods for switching times. Local access or peer to peer communications inherently require very short switching times. By configuring the LTE system with large switching times; however, it is possible to create an opportunity for time division operation LTE downlink, peer to peer communication, and LTE uplink using the same spectrum. The discovery and peer to peer communication would occur during the intentionally long switching interval.

From the above discussion it should be appreciated that numerous variations and embodiments are possible.

The techniques of various embodiments may be implemented using software, hardware and/or a combination of software and hardware. Various embodiments are directed to apparatus, e.g., multi-mode wireless communications device, such as mobile terminals, base stations, communications system. Various embodiments are also directed to methods, e.g., methods of controlling and/or operating a multi-mode wireless communications device. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal receiving, processing, decision making and/or operating in different modes of operation steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., control node, including a processor configured to implement one, multiple or all of the steps of one or more methods of the invention.

In some embodiments, the processor or processors, e.g., CPUs, of one or more devices, e.g., multi-mode wireless communications device, are configured to perform the steps of the methods described as being performed by the multi-mode wireless communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., multi-mode communications node, with a processor which includes a module corresponding to each of the steps of the various described methods performed by the device in which the processor is included. In some but not all embodiments a device, e.g., control node, includes a module corresponding to each of the steps of the various described methods performed by the device in which the processor is included. The modules may be implemented using software and/or hardware.

Some embodiments are directed to a computer program product comprising a non-transitory computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling and/or operating a multi-mode wireless communications device. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a multi-mode wireless communications device, or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a multi-mode wireless communications device, the method comprising:
    during a first time period, operating in a first one of a downlink mode of operation and an uplink mode of operation using a first communications protocol;
    during a second time period, switching from said first one of said downlink mode of operation and said uplink mode of operation to a second one of said downlink mode of operation and uplink mode of operation, refraining from communicating with a base station, and performing at least one of receiving and transmitting a peer to peer signal using a second communications protocol which is different from said first communications protocol, wherein the second time period is one of a switching time period and a guard time period and wherein performing at least one of receiving and transmitting a peer to peer signal includes at least one of transmitting a peer discovery signal and receiving a peer discovery signal; and
    operating during a third time period in said second one of said downlink mode of operation and said uplink mode of operation using said first communications protocol, said third time period following said first and second time periods.

2. The method of claim 1, wherein said second time period is a time period used for switching between said downlink mode of operation and said uplink mode of operation in accordance with said first communications protocol.

3. The method of claim 1, wherein refraining from communicating with the base station comprises controlling said multi-mode wireless communications device to refrain from transmitting or receiving signals using said first communications protocol during said second time period.

4. The method of claim 1, wherein said first communications protocol is a time division duplexing (TDD) cellular communications protocol.

5. A multi-mode wireless communications device, comprising:
    means for controlling the multi-mode wireless communications device to operate, during a first time period, in a first one of a downlink mode of operation and an uplink mode of operation using a first communications protocol;
    means for switching, during a second time period, from said first one of said downlink mode of operation and said uplink mode of operation to a second one of said downlink mode of operation and uplink mode of operation, wherein the second time period is one of a switching time period and a guard time period;
    means for refraining from communicating with a base station during said second time period;
    means for performing, during said second time period, at least one of receiving and transmitting a peer to peer signal using a second communications protocol which is different from said first communications protocol, wherein said means for performing, during said second time period, at least one of receiving and transmitting a peer to peer signal includes at least one of means for transmitting a peer discovery signal and means for receiving a peer discovery signal; and
    means for controlling the multi-mode wireless communications device to operate during a third time period in said second one of said downlink mode of operation and said uplink mode of operation using said first communications protocol, said third time period following said first and second time periods.

6. The multi-mode wireless communications device of claim 5, wherein said second time period is a time period used for switching between said downlink mode of operation and said uplink mode of operation in accordance with said first communications protocol.

7. The multi-mode wireless communications device of claim 5, wherein the means for refraining from communicating with the base station during said second time period comprises means for controlling said multi-mode wireless communications device to refrain from transmitting or receiving signals using said first communications protocol during said second time period.

8. The multi-mode wireless communications device of claim 5, wherein said first communications protocol is a time division duplexing (TDD) cellular communications protocol.

9. A computer program product for use in a multi-mode wireless communications device, the computer program product comprising:
    a non-transitory computer readable medium comprising:
        code for causing at least one computer to control said multi-mode wireless communications device to operate, during a first time period, in a first one of a downlink mode of operation and an uplink mode of operation using a first communications protocol;
        code for causing the at least one computer to control said multi-mode wireless communications device to switch, during a second time period, from said first one of said downlink mode of operation and said uplink mode of operation to a second one of said downlink mode of operation and uplink mode of operation, refrain from communicating with a base station, and perform at least one of receiving and transmitting a peer to peer signal using a second communications protocol which is different from said first communications protocol, wherein the second time period is one of a switching time period and a guard time period and wherein said code for causing the at least one computer to control said multi-mode wireless communications device to switch during said second time period also includes code for at least one of receiving and transmitting a peer to peer signal and includes at least one of code for transmitting a peer discovery signal and code for receiving a peer discovery signal; and code for causing the at least one computer to control said multi-mode wireless communications device to operate, during a third time period, in said second one of said downlink mode of operation and said uplink mode of operation using said first communications protocol, said third time period following said first and second time periods.

10. A multi-mode wireless communications device, comprising:

at least one processor configured to:

control said multi-mode wireless communications device to operate, during a first time period, in a first one of a downlink mode of operation and an uplink mode of operation using a first communications protocol;

switch, during a second time period, from said first one of said downlink mode of operation and said uplink mode of operation to a second one of said downlink mode of operation and uplink mode of operation, wherein the second time period is one of a switching time period and a guard time period and wherein transmit or receive a peer to peer discovery signal during at least one of said time periods during which said second communications device is switching between downlink and uplink modes of operation;

refrain from communicating with a base station;

perform, during said second time period, at least one of receiving and transmitting a peer to peer signal using a second communications protocol which is different from said first communications protocol; and control said multi-mode communications device to operate, during a third time period, in said second one of said downlink mode of operation and said uplink mode of operation using said first communications protocol, said third time period following said first and second time periods; and a memory coupled to said at least one processor.

11. The multi-mode wireless communications device of claim 10, wherein said second time period is a time period used for switching between said downlink mode of operation and said uplink mode of operation in accordance with said first communications protocol.

12. The multi-mode wireless communications device of claim 10, wherein said at least one processor is further configured to control said multi-mode wireless communications device to refrain from transmitting or receiving signals using said first communications protocol during said second time period.

13. The multi-mode wireless communications device of claim 10, wherein said first communications protocol is a time division duplexing (TDD) cellular communications protocol.

14. A method of operating a first communications device, the method comprising:

synchronizing operation with a second communications device which is a time division duplex (TDD) communications device which uses a TDD communications protocol; and limiting transmission of signals by said first communications device using a first communications protocol, which is different from said TDD communications protocol, to time periods during which said second communications device is switching between downlink and uplink modes of operation and the second device does not transmit signals, wherein each of the time periods is one of a switching time period and a guard time period; and transmitting or receiving a peer to peer discovery signal during at least one of said time periods during which said second communication device is switching between downlink and uplink modes of operation.

15. The method of claim 14, wherein said first communications protocol is a peer to peer communications protocol.

16. The method of claim 15, wherein said first communications device does not transmit signals using said TDD communications protocol.

17. The method of claim 14, wherein said second communications device is a base station of a cellular network; and wherein said first communications device is a peer to peer communications device which supports direct device to device communications but does not support communications through said base station.

18. A first communications device, comprising:

means for synchronizing operation with a second communications device which is time division duplex (TDD) communications device which uses a TDD communications protocol; and means for limiting transmission of signals by said first communications device using a first communications protocol, which is different from said TDD communications protocol, to time periods during which said second communications device is switching between downlink and uplink modes of operation and the second device does not transmit signals, wherein each of the time periods is one of a switching time period and a guard time period; and means for transmitting or receiving a peer to peer discovery signal during at least one of said time periods during which said second communications device is switching between downlink and uplink modes of operation.

19. The first communications device of claim 18, wherein said first communication protocol is a peer to peer communications protocol.

20. The first communications device of claim 19, wherein said first communications device does not transmit signals using said TDD communications protocol.

21. The first communications device of claim 18, wherein said second communications device is a base station of a cellular network; and wherein said first communications device is a peer to peer communications device which supports direct device to device communications but does not support communications through said base station.

22. A computer program product for use in a first communications device, the computer program product comprising:

a non-transitory computer readable medium comprising:

code for causing at least one computer to control the first wireless communications device to synchronize operation with a second communications device which is time division duplex (TDD) communications device which uses a TDD communications protocol;

code for causing said at least one computer to control to limit transmission of signals by said first communications device using a first communications protocol, which is different from said TDD communications protocol, to time periods during which said second communications device is switching between downlink and uplink modes of operation and the second device does not transmit signals, wherein each of the time periods is one of a switching time period and a guard time period; and code for transmitting or receiving a peer to peer discovery signal during at least one of said time periods during which said second communications device is switching between downlink and uplink modes of operation.

23. A first wireless communications device, comprising:
at least one processor configured to:
synchronize operation with a second communications device which is time division duplex (TDD) communications device which uses a TDD communications protocol; and limit transmission of signals by said first communications device using a first communications protocol, which is different from said TDD communications protocol, to time periods during which said second communications device is switching between downlink and uplink modes of operation and the second device does not transmit signals, wherein each of the time periods is one of a switching time period and a guard time period; transmit a peer to peer signal during at least one of said time periods during which said second communications device is switching between downlink and uplink modes of operation and memory coupled to said at least one processor.

24. The first communications device of claim 23, wherein said first communications protocol is a peer to peer communications protocol.

25. The first communications device of claim 24, wherein said first communications device does not transmit signals using said TDD communications protocol.

* * * * *